(12) United States Patent
Laroia et al.

(10) Patent No.: US 7,444,127 B2
(45) Date of Patent: Oct. 28, 2008

(54) METHODS AND APPARATUS FOR SELECTING BETWEEN MULTIPLE CARRIERS USING A RECEIVER WITH MULTIPLE RECEIVER CHAINS

(75) Inventors: Rajiv Laroia, Basking Ridge, NJ (US); Junyi Li, Somerset, NJ (US); Frank A. Lane, Asbury, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 785 days.

(21) Appl. No.: 10/965,117

(22) Filed: Oct. 14, 2004

(65) Prior Publication Data

US 2005/0233716 A1 Oct. 20, 2005

Related U.S. Application Data

(63) Continuation-in-part of application No. 10/872,674, filed on Jun. 21, 2004, now Pat. No. 6,990,324.

(60) Provisional application No. 60/562,900, filed on Apr. 15, 2004.

(51) Int. Cl.
*H04B 7/08* (2006.01)
*H04B 7/12* (2006.01)
(52) U.S. Cl. .................. 455/140; 455/552.1; 370/335
(58) Field of Classification Search .............. 455/552.1, 455/553.1, 67.11, 226.1, 226.2, 226.3, 339; 370/335, 342, 130; 375/130
See application file for complete search history.

(56) References Cited

U.S. PATENT DOCUMENTS 5,507,010 A 4/1996 Ahonen

| 5,896,562 | A | * | 4/1999 | Heinonen ..................... 455/76 |
|---|---|---|---|---|
| 5,915,212 | A | | 6/1999 | Pzelomiec |
| 6,216,012 | B1 | | 4/2001 | Jensen |
| 6,272,313 | B1 | | 8/2001 | Arsenault et al. |
| 6,292,508 | B1 | | 9/2001 | Hong et al. |
| 6,347,234 | B1 | | 2/2002 | Scherzer |
| 2002/0037742 | A1 | | 3/2002 | Enderlein et al. |
| 2002/0094785 | A1 | | 7/2002 | Deats |
| 2004/0203567 | A1 | | 10/2004 | Berger |
| 2005/0085265 | A1 | | 4/2005 | Laroia et al. |
| 2005/0124345 | A1 | | 6/2005 | Laroia et al. |

OTHER PUBLICATIONS

International Search Report and The Written Opinion of The Searching Authority for PCT/US2004/34223, dated Feb. 24, 2005, pp. 1-9.

* cited by examiner

*Primary Examiner*—Edward Urban
*Assistant Examiner*—Christian A Hannon
(74) *Attorney, Agent, or Firm*—Kenneth K. Vu; Jeffrey D. Jacobs; Thomas R. Rouse

(57) ABSTRACT

Receivers accommodating frequency band selection methods in wireless communications systems are described. Different frequency bands are associated with different alternative carrier frequencies and/or base station cell and/or sector transmitter connection alternatives. Mobile node receivers include two receiver chains, each chain processing signals corresponding to a carrier. In some embodiments, each receiver chain includes its own controllable RF module, and individual carrier band selection is performed in each RF module. In some embodiments, the two receiver chains share a common RF module; however, each chain includes its own controllable baseband filter. In various embodiments, the first chain has higher complexity than the second chain. In most embodiments, each chain uses the same technology, e.g., spread spectrum OFDM or CDMA. Each chain obtains a quality indicator value on a different band and a comparison of quality indicator values is used in selecting the channel and carrier band for downlink traffic signaling.

64 Claims, 10 Drawing Sheets

METHODS AND APPARATUS FOR SELECTING BETWEEN MULTIPLE CARRIERS USING A RECEIVER WITH MULTIPLE RECEIVER CHAINS

RELATED APPLICATIONS

The present application claims the benefit of U.S. Provisional Patent Application Ser. No. 60/562,900, filed Apr. 15, 2004 which is hereby expressly incorporated by reference and is a continuation in part of U.S. patent application Ser. No. 10/872,674 filed on Jun. 21, 2004 now U.S. Pat. No. 6,990,324.

FIELD OF THE INVENTION

The present invention relates to communications systems and, more particularly, to methods and apparatus for implementing and using wireless communications devices including two receiver chains where the method may include methods for using the two receiver chains to support selection between multiple carriers.

BACKGROUND

From an implementation perspective, it may be beneficial to use different carriers in different portions of a communications system, e.g., because rights to different frequencies are owned in different geographic locations and/or because it is desirable to minimize signal interference through the use of different carriers. Spread spectrum wireless communications systems may use different carriers throughout a system with each carrier being associated a different frequency band. In some wireless communications systems, different cells and/or sectors use different carriers. In some systems, the same sector or same cell uses different carriers each with an associated frequency band, e.g., where the total available bandwidth in a cell or sector is partitioned into different frequency bands, e.g., distinct frequency bands.

Wireless terminals (WTs), e.g., mobile nodes, may travel throughout the communications system and establish a connection with a given sector/cell base station using a particular carrier frequency and associated band, e.g., for downlink signaling. As conditions vary, e.g., due to a change in loading conditions, e.g., more users, on the carrier frequency, due to changes in levels of interference, or due to the WT moving, e.g., approaching a cell/sector boundary, it may be advantageous or necessary for the WT to transfer to a different carrier and attach to a different cell/sector/carrier frequency combination corresponding to a base station transmitter. Typically, in known systems, many wireless terminal receiver implementations use a single receiver chain and the wireless terminal remains on the same carrier until forced to switch, e.g., by a disruption in communications with the base station. This approach is undesirable since the WT experiences breaks in communications at boundaries and experiences changes in reception quality, e.g., fading, as the WT moves throughout the system. Other known receiver implementations use a single receiver chain, where the receiver interrupts communications with the connected base station transmitter and switches from the carrier in use, temporarily, to search and evaluate alternative potential carriers. This approach is undesirable since the WT disrupts normal communication sessions during the search intervals, expends time retuning the filter, e.g., RF filter, to adjust for each search frequency, expends time to wait for a detected carrier, collect and evaluate any received signals, e.g., pilot signals, and then expends time to re-tune to the original carrier setting.

In light of the above discussion, it is apparent that there is a need for improved methods and apparatus directed to efficient wireless terminal receiver design and operation. It would be beneficial if such apparatus and methods allowed for estimating the quality of two alternative channels using different carrier frequency bands at the same time without disrupting a communications session in progress. It would also be advantageous if such methods provided for continuous tracking of alternative carriers, allowing for wireless terminal selection of the carrier frequency/cell/sector base station attachment point, allowing for switching before disruptions in communications, allowing for the switching to occur at a convenient point, and allowing for switching in response to other considerations, e.g., system load conditions.

SUMMARY OF THE INVENTION

The present invention is directed to methods and apparatus for implementing wireless communications devices. The devices of the present invention include multiple receiver chains.

Various receivers, implemented in accordance with the invention accommodating frequency band selection methods in wireless communications systems are described. Different frequency bands are associated with different alternative carrier frequencies and/or base station cell and/or sector transmitter connection alternatives. Wireless terminals, e.g., mobile nodes such as Personal Data Assistants, Notebook computers, etc, include two receiver chains, each chain processing signals corresponding to a carrier. In some embodiments, each receiver chain includes its own controllable RF module, and individual carrier band selection is performed in each RF module. In other embodiments, the two receiver chains share a common RF module but each chain includes its own controllable baseband filter. In numerous embodiments, the first receiver chain has higher implementation complexity, e.g., in terms of hardware used and/or computations performed, than the second receiver chain. In most, but not all embodiments, each chain uses the same communications technology, e.g., spread spectrum OFDM or CDMA.

In accordance with the invention, each chain obtains and/or generates a quality indicator value for a different communications band and a comparison of quality indicator values is used in selecting the channel and carrier band for downlink traffic signaling.

Numerous additional benefits and embodiments of the present invention are discussed in the detailed description which follows.

DESCRIPTION OF THE INVENTION

Figure 1:
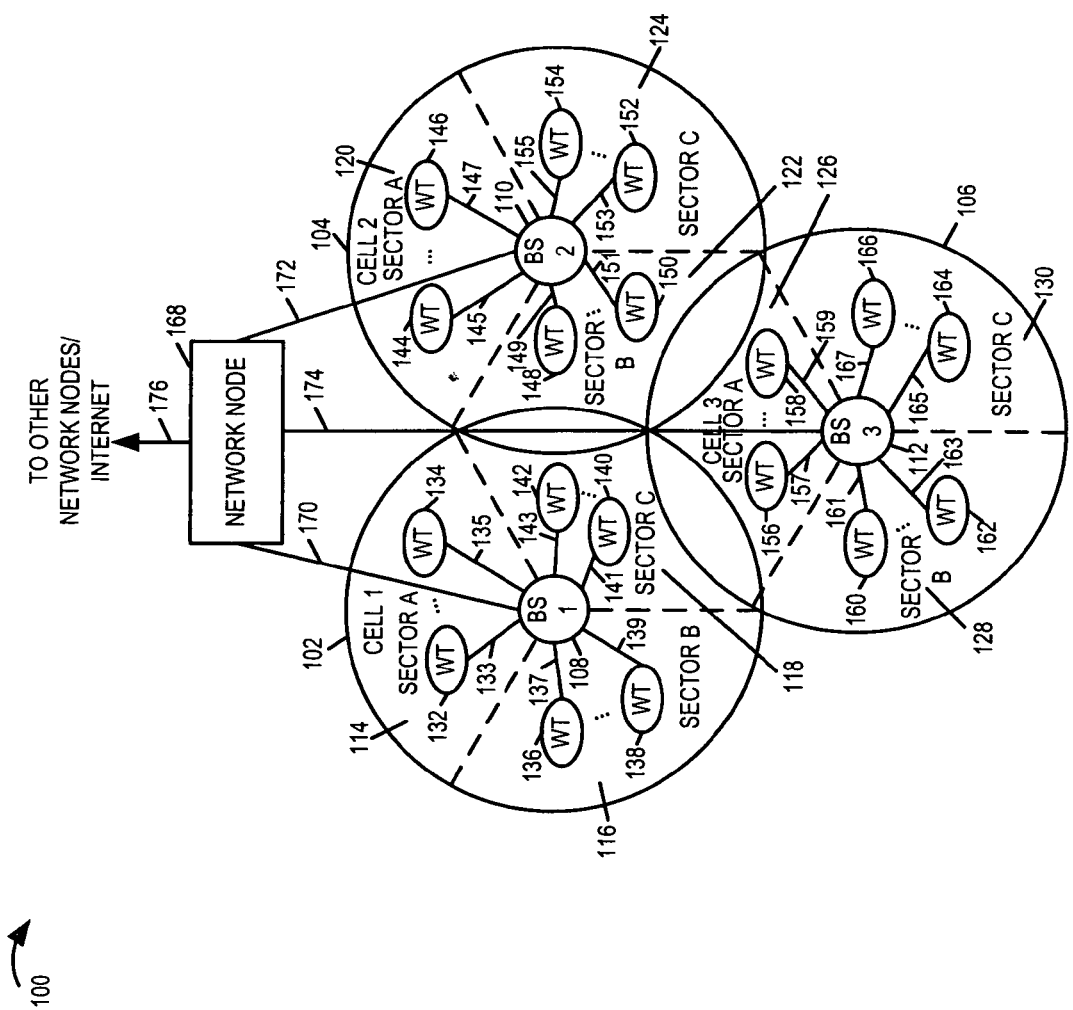
FIG. 1 is a drawing of an exemplary wireless communications system supporting multiple carriers implemented in accordance with the invention and using methods of the present invention.

FIG. 1 shows an exemplary wireless communications system 100, supporting multiple carriers and spread spectrum signaling, implemented in accordance with the present invention. The system 100 uses apparatus and methods of the present invention. FIG. 1 includes a plurality of exemplary multi-sector cells, cell 1 102, cell 2 104, cell 3 106. Each cell (102, 104, 106) represents a wireless coverage area for a base station (BS), (BS1 108, BS2 110, BS 3 112), respectively. In the exemplary embodiment, each cell 102, 104, 106 includes three sectors (A, B, C). Cell 1 102 includes sector A 114, sector B 116, and sector C 118. Cell 2 104 includes sector A 120, sector B 122, and sector C 124. Cell 3 106 includes sector A 126, sector B 128, and sector C 130. In other embodiments, different numbers of sectors are possible, e.g., 1 sector per cell, 2 sectors per cell, or more than 3 sectors per cell. In addition, different cells may include different numbers of sectors.

Wireless terminals (WTs), e.g., mobile nodes (MNs) may move throughout the system and communicate with peer nodes, e.g., other MNs, via a wireless link to a BS. In cell 1 102 sector A 114, WTs (132, 134) are coupled to BS 1 108 via wireless links (133, 135), respectively. In cell 1 102 sector B 116, WTs (136, 138) are coupled to BS 1 108 via wireless links (137, 139), respectively. In cell 1 102 sector C 118, WTs (140, 142) are coupled to BS 1 108 via wireless links (141, 143), respectively. In cell 2 104 sector A 120, WTs (144, 146) are coupled to BS 2 110 via wireless links (145, 147), respectively. In cell 2 104 sector B 122, WTs (148, 150) are coupled to BS 2 110 via wireless links (149, 151), respectively. In cell 2 104 sector C 124, WTs (152, 154) are coupled to BS 2 110 via wireless links (153, 155), respectively.

BSs may be coupled together via a network, thus providing connectivity for WTs within a given cell to peers located outside the given cell. In system 100, BSs (108, 110, 112) are coupled to network node 168 via network links (170, 172, 174), respectively. Network node 168, e.g., a router, is coupled to other network nodes, e.g., other base stations, routers, home agent nodes, AAA server nodes, etc., and the Internet via network link 176. Networks links 170, 172, 174, 176 may be, e.g., fiber optic links.

BSs 108, 110, 112 include sectorized transmitters, each sector transmitter using a specific assigned carrier frequency to transmit downlink signals, e.g., broadcast signals such as assignment signals, beacon signals, and/or pilot signals, and signals directed to specific WT(s) such as downlink traffic signals, in accordance with the invention. Such downlink signals provide information to the WTs, e.g., WT 132, which may be used to evaluate and decide which carrier frequency to select and which corresponding base station sector/cell to use as an attachment point. The WTs, e.g., WT 132, include receivers with the capability to process information from BSs 108, 110, 112 providing information on alternative carrier frequencies bands that may be used for ordinary communications, e.g., downlink traffic channel signaling to the WT, and that may be selected by the WT. In accordance with the invention, the WT can receive downlink signals from within two alternative carrier frequency bands and evaluate two alternative carrier frequency connection options at the same time.

Figure 2:
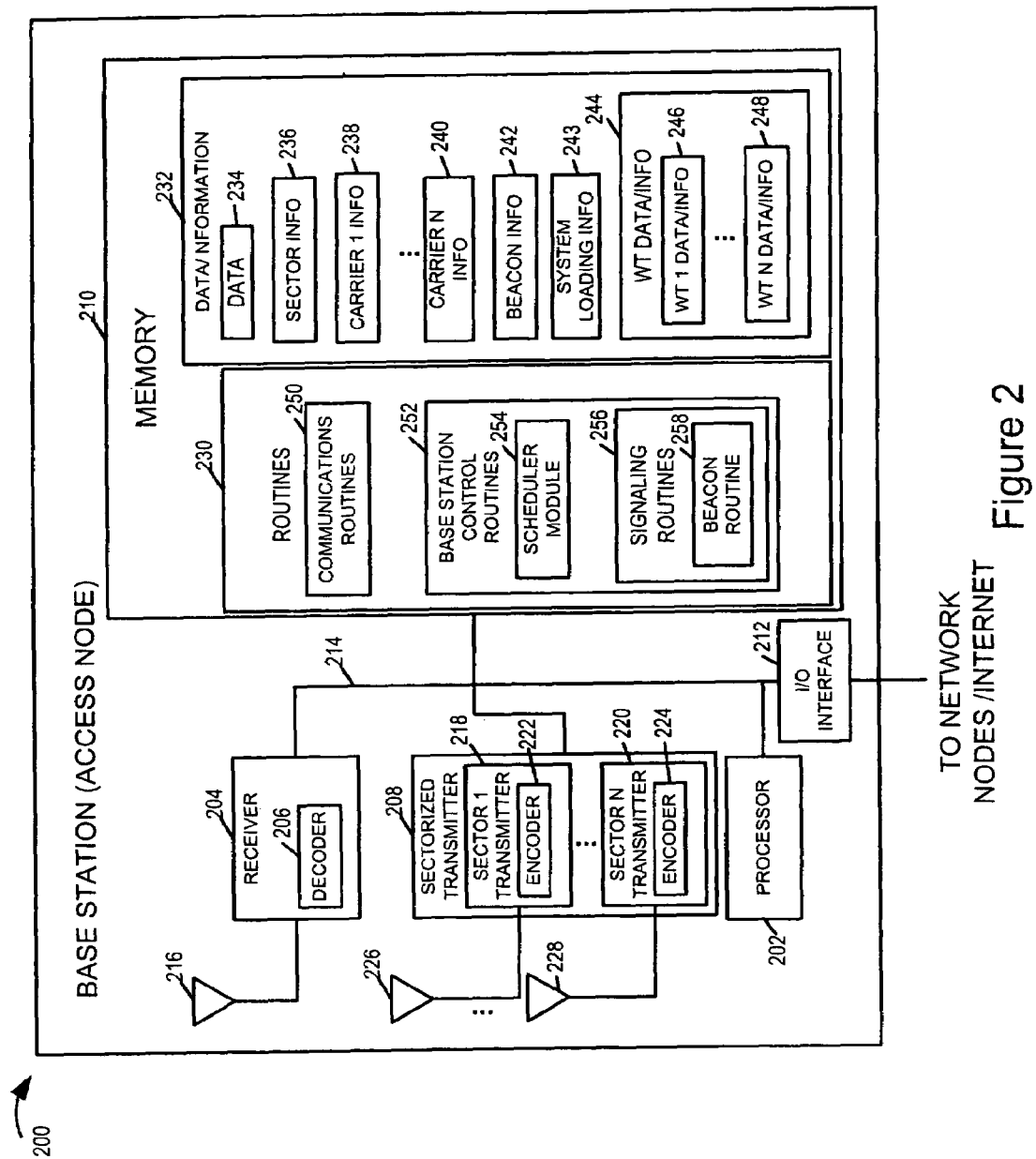
FIG. 2 is a drawing of an exemplary base station implemented in accordance with the present invention and using methods of the present invention.

FIG. 2 illustrates an exemplary base station 200, alternately referred to as an access node, implemented in accordance with the present invention. The BS is called an access node because it serves as a WT's point of network attachment and provides the WT access to the network. The base station 200 of FIG. 2 may be a more detailed representation of any of the base stations 108, 110, 112 of the system 100 of FIG. 1. The base station 200 includes a processor 202, e.g., CPU, a receiver 204 including a decoder 206, a sectorized transmitter 208, a memory 210, and an I/O interface 212 coupled together via a bus 214 over which the various elements can interchange data and information. The receiver 204 is coupled to a sectorized antenna 216 and can receive signals from wireless terminals 300 (see FIG. 3) in each of the sectors covered by the base station 200. The receiver's decoder 206 decodes received uplink signals and extracts the information encoded by the WTs 300 prior to transmission. The sectorized transmitter 208 includes a plurality of transmitters, a sector 1 transmitter 218, a sector N transmitter 220. Each sector transmitter (218, 220) includes an encoder (222, 224), for encoding downlink data/information, and is coupled to an antenna (226, 228), respectively. Each antenna 226, 228 corresponds to a different sector and is normally oriented to transmit into the sector to which the antenna corresponds and may be located. Antennas 226, 228 may be separate or may correspond to different elements of a single multi-sector antenna which has different elements for different sectors. Each sector transmitter (218, 220) has an assigned carrier frequency band to be used for downlink signaling, e.g., downlink traffic signals, assignment signals, pilot signals, and/or beacon signals. The base station I/O interface 212 couples the base station 200 to other network nodes, e.g., other access nodes, routers, AAA servers, home agent nodes, and the Internet. The memory 210 includes routines 230 and data/information 232. The processor 202 executes routines 230 and uses the data/information 232 in the memory 210 to control the operation of the base station 200 including scheduling users on different carrier frequencies using different power levels, power control, timing control, communication, signaling, and beacon signaling in accordance with the invention. The scheduling of a particular user, e.g., a particular WT 300, on a particular carrier frequency, may be in response to a selection performed by the WT 300, in accordance with the invention.

The data/information 232 in the memory 210 includes data 234, e.g., user data to be transmitted to and received from wireless terminals 300, sector information 236 including carrier frequencies associated with each sector and data transmission power levels associated with each carrier frequency within the sector, a plurality of carrier frequency information (carrier 1 info 238, carrier N info 240), beacon information 242, and system loading information 243. Carrier frequency information (238, 240) includes information defining the frequency of the carrier and the associated bandwidth. The beacon information 242 includes tone information, e.g., information associating beacon signals in each sector with specific frequencies and carriers, and sequence timing associated to transmit the beacon signals. The system loading information 243 includes composite loading information on each of various carrier bands supported by the base station 200. System loading information 243 may be transmitted from the base station 200 to the WTs 300 which may use the information, in some embodiments, in the decision process of the selection of bands to set within the receiver's chains.

The data/information 232 in memory 210 also includes a plurality of WT data/information 244 sets, a set for each WT: WT 1 data/info 246, WT N data/info 248. WT 1 data/info 246 includes user data in route from/to WT 1, a terminal ID associating the WT to the base station 200, a sector ID identifying the sector in which WT 1 is currently located and carrier frequency information associating WT 1 to a specific carrier frequency used for downlink signaling.

Base station routines 230 include communications routines 250, and base station control routines 252. The communications routines 250 may implement the various communications protocols used by the base station 200. The base station control routines 252 include a scheduler module 254 and signaling routines 256. The base station control routines 252 control base station operation including the receivers 204, transmitters (218, 220), scheduling, signaling, and beacon signaling in accordance with the present invention. The scheduler module 254, e.g., a scheduler, is used for scheduling air link resources, e.g. bandwidth over time, to wireless terminals 300 for uplink and downlink communications. Base station control routines 252 also include signaling routines 256 which control: the receivers 204, the decoder 206, the transmitters 218, 220, the encoders 222, 224, ordinary signal generation, data and control tone hopping, and signal reception. The beacon routine 258, also included in the signaling routines 256, uses the beacon information 242 to control the generation and transmission of beacon signals in accordance with the invention. In accordance with the invention, in some embodiments, beacon signals, e.g., high power signals which are relatively narrow in terms of frequency, may be transmitted by each sector transmitter within the carrier band assigned to that sector transmitter. These beacon signals are, in some embodiments, used by the WTs 300 to compare alternative available carrier signals and evaluate alternative downlink channels using alternative carriers.

Figure 3:
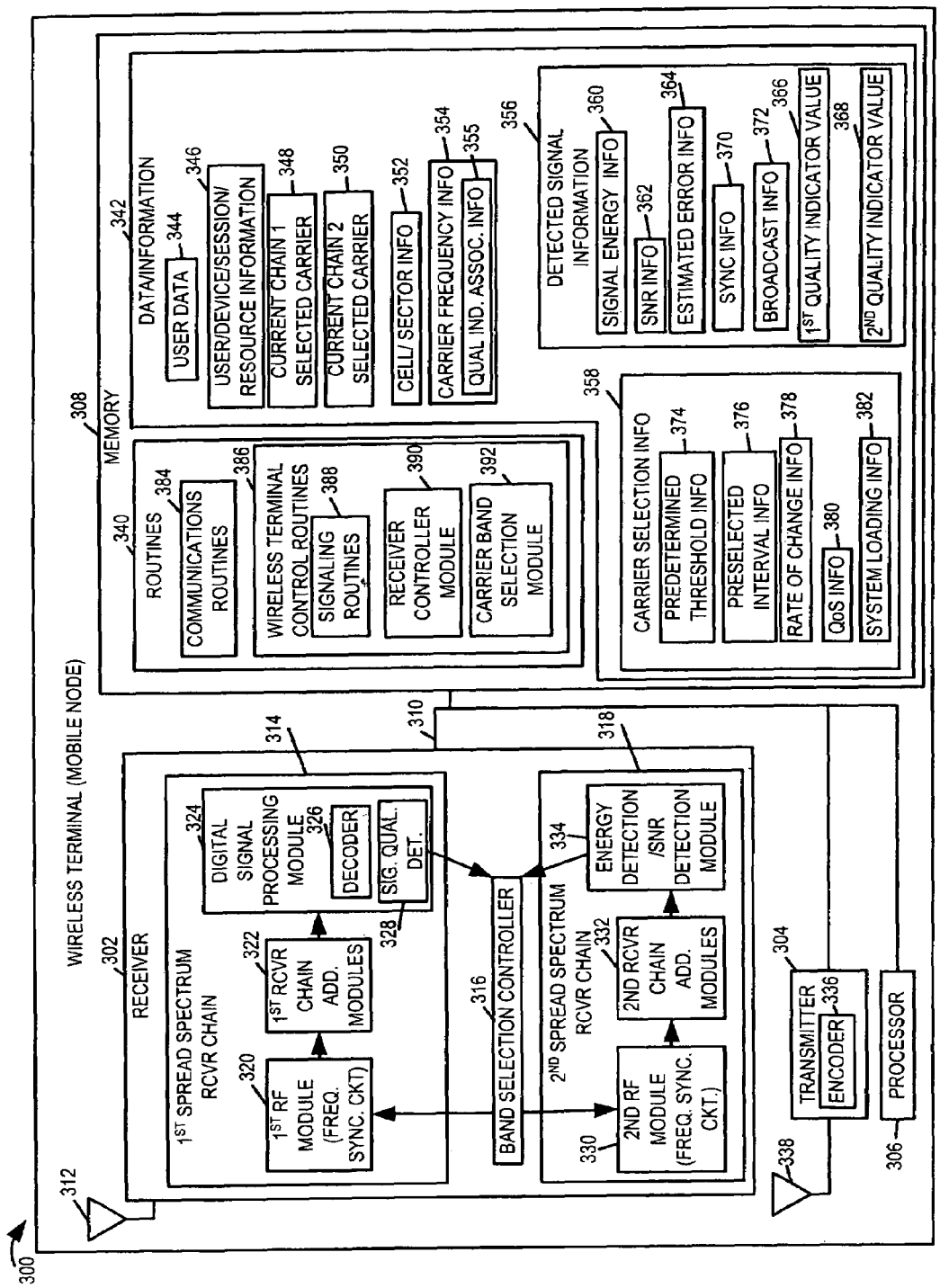
FIG. 3 is a drawing of an exemplary wireless terminal implemented in accordance with the present invention and using methods of the present invention.

FIG. 3 illustrates an exemplary wireless terminal 300, e.g., mobile node, implemented in accordance with the present invention and using methods of the present invention. The wireless terminal 300 of FIG. 3 may be a more detailed representation of any of the WTs 132, 134, 136, 138, 140, 142, 144, 146, 148, 150, 152, 154, 156, 158, 160, 162, 164, 166 of the system 100 of FIG. 1. The wireless terminal 300 includes a receiver 302, a transmitter 304, a processor 306, e.g., CPU, and memory 308 coupled together via a bus 310 over which the various elements can interchange data and information.

The receiver 302 is coupled to an antenna 312 through which downlinks signals are received from a plurality of base station sector transmitters and corresponding sector antennas 226, 228. The receiver 302 includes a $1^{st}$ spread spectrum receiver chain 314, a $2^{nd}$ spread spectrum receiver chain 318, and a band selection controller 316. The $1^{st}$ spread spectrum receiver chain 314 includes a $1^{st}$ RF module (frequency synchronization circuit) 320, $1^{st}$ receiver chain additional modules 322, and a digital signal processing module 324. Digital signal processing module 324 includes a decoder 326 and a signal quality detector module 328. The $2^{nd}$ spread spectrum receiver chain 318, includes a $2^{nd}$ RF module (frequency synchronization circuit) 330, $2^{nd}$ receiver chain additional modules 332, and an energy detection/SNR detection module 334. In most embodiments, the $1^{st}$ receiver chain 314 has greater capabilities than the $2^{nd}$ receiver chain 318, and the $1^{st}$ receiver chain is the chain used for decoding and forwarding downlink traffic data/information.

The $1^{st}$ RF module 320, $1^{st}$ receiver chain additional modules 322, and digital signal processing module 324 are used for receiving, decoding, measuring and evaluating downlink signals including, e.g., assignment signals, downlink traffic channel data and information signals, pilot signals, and/or beacon signals being communicated by a base station sector transmitter on a currently selected first band associated with a specific first carrier frequency. Band selection controller 316 outputs a signal to the $1^{st}$ RF module 320 to select a specific carrier frequency; the $1^{st}$ RF module 320 passes signals within the selected carrier frequency band and rejects at least some of the signals outside the selected carrier frequency band. Output signals passed by the RF module 320 are processed, e.g., additionally filtered and converted from analog to digital signals by the $1^{st}$ receiver chain additional modules 322. Then the signals are output from the $1^{st}$ receiver chain additional modules 322 and forwarded to the digital signal processing module 324. Digital signal processing module 326 includes a decoder 326, which can decode both user specific and broadcast signal. The digital signal processing module also includes a signal quality detector 328 which generates quality indication information indicative of downlink signaling quality between the base station sector transmitter and WT 300 using the carrier selected by $1^{st}$ RF module 320.

The second RF module 330 and $2^{nd}$ receiver chain additional modules 332 are used to receive downlink signals from a second base station sector transmitter using a second carrier band in parallel to the reception in the first carrier band, the second carrier band being different than the first carrier band. Signals being processed through the second RF module 330 and second receiver chain additional modules 332 are evaluated for energy detection and/or SNR by the energy detection and/or SNR detection module 334.

The $2^{nd}$ RF module 330, $2^{nd}$ receiver chain additional modules 332, and energy detection/SNR detection module 334 are used for receiving, measuring and evaluating downlink signals including, e.g., assignment signals, downlink traffic channel data and information signals, pilot signals, and/or beacon signals being communicated by a base station sector transmitter on a currently selected second band associated with a specific second carrier frequency. In some embodiments, decoding is performed on some broadcast signals. Band selection controller 316 outputs a signal to the $2^{nd}$ RF module 330 to select a specific carrier frequency; the $2^{nd}$ RF module 330 passes signals within the selected carrier frequency band and rejects at least some of the signals outside the selected carrier frequency band. Output signals passed by the $2^{nd}$ RF module 330 are processed, e.g., additionally filtered and converted from analog to digital signals by the $2^{nd}$ receiver chain additional modules 332. Then the signals are output from the $2^{nd}$ receiver chain additional modules 332 are forwarded to the energy detection/SNR detection module 334. The energy detection/SNR detection module 334 generates quality indication information indicative of downlink signaling quality between the base station sector transmitter and WT 300 using the carrier selected by $2^{nd}$ RF module 330.

Outputs, e.g. quality indicator values, from the signal quality detector module 328 of the digital signal processing module 324 and from the energy detection/SNR detection module 334 are input to the band selection module 316, which controls the selection of the frequency band setting in the RF modules (frequency synchronization circuits) 320, 330, in accordance with the invention.

In some embodiments, $1^{st}$ receiver chain 314 and $2^{nd}$ receiver chain 318 use a common RF module instead of two distinct RF modules (320, 330). In such an embodiment, the band selection controller 316 is coupled to the $1^{st}$ and $2^{nd}$ receiver chain additional modules (322, 332), e.g., controlling baseband filters within modules (322, 332), and thereby passing different carrier frequency band inclusive information for each chain 314, 318. For example, the common RF module may pass a 5 MHz BW signal, while each baseband filter shall selectively pass a different 1.25 MHz BW signal.

In most embodiments, $1^{st}$ receiver chain 314 has a higher level of complexity than $2^{nd}$ receiver chain 318. In most embodiments, $1^{st}$ receiver chain 314 uses the same technology as the second receiver chain, e.g., both chains are implemented to process spread spectrum OFDM signals or both chains are implemented to process CDMA signals. In some embodiments, the two receiver chains 314, 318 have the same level of complexity.

Transmitter 304 includes an encoder 336 and is coupled to transmitter antenna 338. Data/information, e.g., blocks of uplink data/information may be encoded by encoder 336 and then transmitted through antenna 338 to base station 200.

The memory 308 includes routines 340 and data/information 342. The processor 306, e.g., a CPU, executes the routines 340 and uses the data/information 342 in memory 308 to operate the WT 300 and implement the methods of the present invention.

Wireless terminal data/information 342 includes user data 344, user device/session resource information 346, current chain 1 selected carrier information 348, current chain 2 selected carrier information 350, cell/sector information 352, carrier frequency information 354, detected signal information 356, and carrier selection information 358.

User data 344 includes data, information and files intended to be sent to/or received from a peer node in a communications session with the wireless terminal 300. User/device/session resource information 346 includes, e.g., terminal ID information, base station ID information, sector ID information, selected carrier frequency information, mode information, and identified beacon information. The terminal ID information may be an identifier, assigned to the WT 300 by the base station 200 to which the WT 300 is coupled, that identifies the wireless terminal 300 to the base station 200. Base station ID information may be, e.g., a value of slope associated with the base station 200 and used in hopping sequences. Sector ID information includes information identifying the sector ID of the sectorized base station's transmitter/receiver through which ordinary signaling is being communicated, and may correspond to the sector of the cell in which the wireless terminal 300 is located. Selected carrier frequency information includes information identifying the carrier, e.g., the carrier to which the $1^{st}$ RF module has been tuned, being used by the BS for downlink data signaling, e.g. traffic channel signals. Mode information identifies whether the wireless terminal 300 is in an on/hold/sleep state.

Current chain 1 selected carrier information 348 includes information identifying the selected carrier to which $1^{st}$ RF module 320 has been tuned by the band selection controller 316. Current chain 2 selected carrier information 350 includes information identifying the selected carrier to which $2^{nd}$ RF module 330 has been tuned by the band selection controller 316. Cell/sector ID information 352 may include information used to construct hopping sequences used in the processing, transmission, and reception of data, information, control signals, and beacon signals. Carrier frequency information 354 may include information associating each sector/cell of the base stations in the communications system with a specific carrier frequency or frequencies, frequency bands, beacon signals, and sets of tones. Carrier frequency information 354 also includes quality indicator association information 355 which associates each quality indicator value with a specific carrier frequency, which may be selected by the band selection controller 316.

Detected signal information 356 includes signal energy information 360, SNR information 362, estimated error information 364, a $1^{st}$ quality indicator value 366, and a $2^{nd}$ quality indicator value 368. Detected signal information 356 also includes synchronization information 370, and/or broadcast signal information 372.

The detected signal information 356 includes information which has been output from the signal quality detector 328 of the digital signal processing module 324 and from the energy detection/SNR detection module 334 in the receiver 302. Signal quality detector module 328 may measure and record signal energy 360, SNR 362, and/or estimated error rate 364 of signals transmitted by a first transmitter and communicated within the first selected carrier band to which $1^{st}$ receiver chain 314 is set. Signal quality detection module 328 determines a $1^{st}$ quality indicator value 366 indicative of the quality of the channel, e.g., downlink traffic channel, between the first transmitter and the WT 300 when using the carrier band to which the $1^{st}$ receiver chain 314 is currently set. Energy detection/SNR detection module 334 may measure and record signal energy 360 and/or SNR 364 of signals transmitted by a second transmitter and communicated within the selected second carrier band to which the $2^{nd}$ receiver chain 318 is set. Energy detection/SNR detection module 334 determines a $2^{nd}$ quality indicator value 368 indicative of the quality of an alternative channel, e.g., an alternative downlink traffic channel, between the second transmitter and WT 300 using the second carrier band, an alternative carrier band, to which the $2^{nd}$ chain 318 is currently set.

Synchronization information 370 may include, e.g., pilot signal based timing synchronization information used and/or obtained by $2^{nd}$ receiver chain additional modules 332, e.g., while processing a CDMA pilot signal. Broadcast information 372 may include, e.g., broadcast related information used and/or obtained by $2^{nd}$ receiver chain additional modules 332 while processing signals, e.g., pilot or beacon signals.

Carrier selection information 358 includes predetermined threshold information 374, pre-selected interval information 376, rate of change information 378, quality of service information 380, and system loading information 382. The carrier selection information 358 is information, e.g., criteria, limits, etc., used by the WT 300 in making band selection decisions when evaluating the detected signal information, e.g., when comparing $1^{st}$ quality indicator value 366 to $2^{nd}$ quality indicator value 368. Predetermined threshold information 374 includes levels used to compare against quality indicator values 366, 368 for making band selection decisions. Pre-selected interval information 376 includes time intervals of a fixed duration and intervals of a fixed number of signal measurements, each which may be used to define a predetermined interval in which a consistent condition should exist, e.g., second quality indicator exceeds first quality indicator, before the band selection controller 316 changes the selection for the $1^{st}$ receiver chain 314. Rate of change information 378 includes criteria used to identify when the first signal quality indicator value decreases over time while the second signal quality indicator value increases over time and a difference between the first and second quality indicator values changes sign. Quality of Service (QoS) information 380 includes information pertaining to the QoS provided to individual users, band selection as a function of the level of QoS to be provided to a user, and changes in selection as a result of changes in levels of QoS to be provided to the user. System loading information 382 includes received information pertaining to system loading communicated by a base station 200 which may be used in a function controlling decisions regarding band selection.

WT routines 340 include communications routines 384 and wireless terminal control routines 386. Wireless terminal communications routine 384 may implement the various communication protocols used by the wireless terminal 300. Wireless terminal control routines 386 perform the functional control operations of the wireless terminal 300 including power control, timing control, signaling control, data processing, I/O, receiver control and carrier band selection functions in accordance with the invention. The WT control routines 386 include signaling routines 388, a receiver controller module 390 and a carrier band selection module 392. The signaling routines 388 using the data/information 342 in memory 308 control the signaling, e.g., uplink and downlink communicated signals, of the WT 300. The receiver controller module 390 in coordination with modules 324, 334 controls operation of the receiver 302 including the decoding, energy detection and/or SNR detection performed on received signals and the generation of $1^{st}$ and $2^{nd}$ quality indicator values 366, 368, in accordance with the present invention. The carrier band selection module 392 in coordination with the band selection controller 316 uses the data/information derived from the received signals including $1^{st}$ and second quality indicator values 366, 368 as well as carrier selection information 358 to make decisions as to which carrier to select for tuning the RF modules 320, 330 of the receiver 302, in accordance with the present invention.

Figure 4:
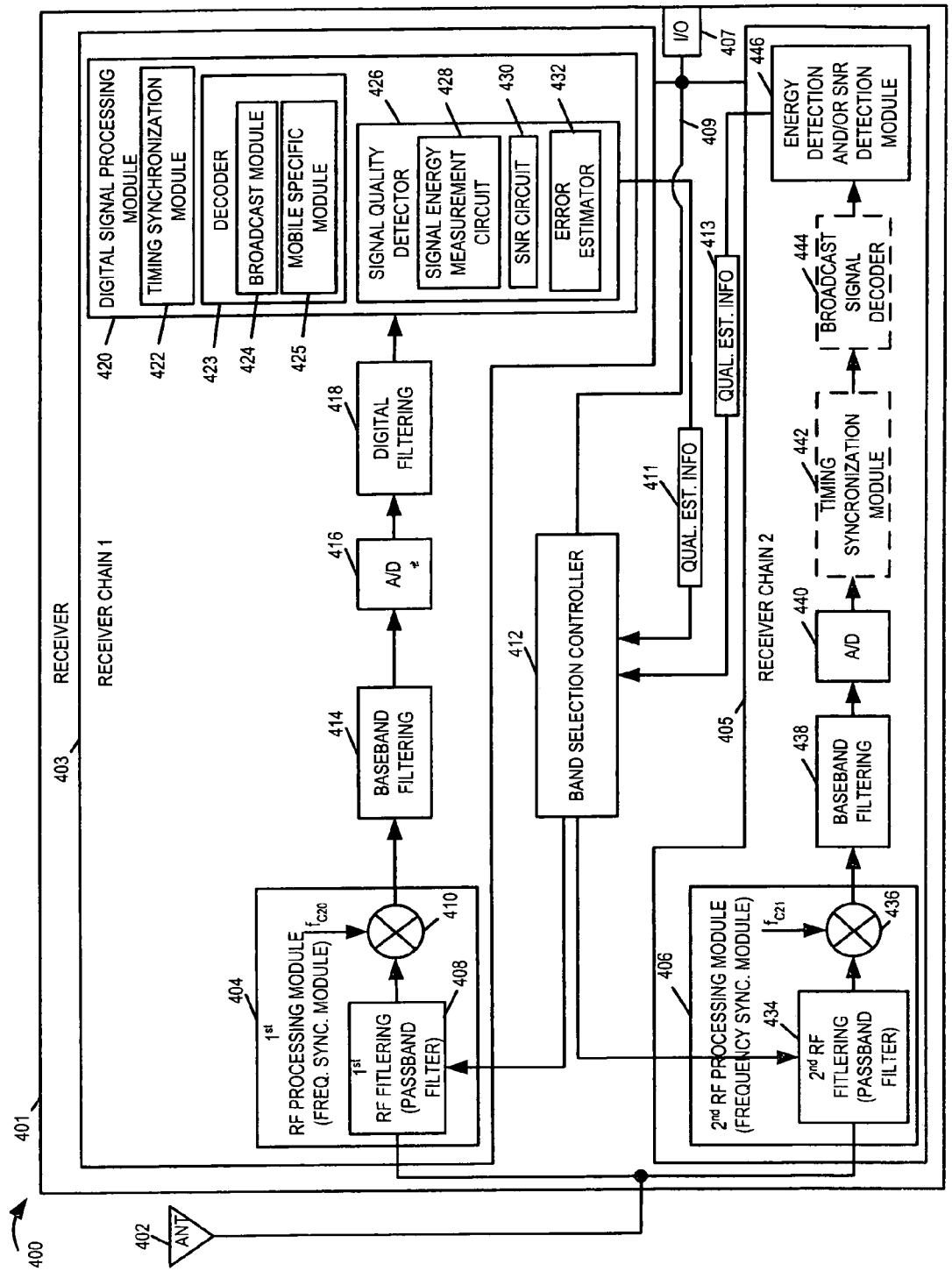
FIG. 4 is a drawing of an exemplary two chain receiver, including a first chain with a higher complexity level than a second chain, implemented in accordance with the present invention and using methods of the present invention.

FIG. 4 is an example of an exemplary wireless terminal receiver 401/antenna 402 combination 400 in accordance with the present invention. The receiver/antenna combination 400 of FIG. 4 may be may be used as the receiver 302/antenna 312 combination in the WT 300 of FIG. 3. Receiver 401 illustrates an exemplary embodiment of a receiver, in accordance with the invention, that can process signals included in two selected carrier bands at the same time, e.g., signals transmitted by different transmitters and/or different transmit antennas. Each received carrier band signal may correspond to a different sector of a cell and/or a different cell. Receiver 401 of FIG. 4 includes a first receiver chain 403, a second receiver chain 405, a band selection controller 412, and an I/O interface 407 coupled together via bus 409 over which the various elements may interchange data and information. The receiver may communicate with other elements of the WT 300 via I/O interface 407 which couples receiver 401 to bus 312. Decoded downlink traffic channel signals may be conveyed via interface 407, e.g., to one or maore external devices such as a display and/or to other WT components.

First receiver chain 403, second receiver chain 405, and band selection controller 412 may correspond to elements (314, 318, 316), respectively, of WT 300 of FIG. 3. The receiver 401 is coupled to an antenna 402 which receives downlink signals from a plurality of sector/cell base station transmitters. The antenna 402 is coupled to a first RF processing module (frequency synchronization circuit) 404 and a second RF processing module (frequency synchronization circuit) 406. The first RF processing module 404 includes a first RF filter 408 and a mixer circuit 410 coupled together. The first RF filter 408 may be implemented as a passband filter and serves as a frequency synchronization circuit. The first RF filtering module 404 has been tuned to a first carrier frequency selected by the band selection controller 412. The $1^{st}$ RF filter 408 passes received signals within the selected carrier band and rejects at least some signals outside the selected carrier band.

The received passband signal from the antenna 402 is input to the RF filter 408, filtered, and processed by a mixer circuit 410 resulting in a baseband signal. The resulting baseband signal is output from the first RF processing module 404 and input to a baseband filter 414. The filtered output from the baseband filter 414 is input to an A/D converter module 416, where analog to digital conversion is performed. The resulting output digital signal is input to a digital filter 418 for additional filtering. Then the output of the digital filter 418 is input to a digital signal processing module 420. The digital signal processing module 420 includes a timing synchronization module 422, a decoder 423, and a signal quality detector 426. Thus, digital signal processing module 520 is capable of fully decoding broadcast as well as WT specific information, e.g., information intended for the individual WT and not other WTs.

The timing synchronization module 422 is used for timing synchronization of received data being processed, e.g., received downlink traffic channel signals. CDMA as well as OFDM embodiments are contemplated. The timing synchronization module 422 in CDMA embodiments may be implemented using known de-spreading techniques. The timing synchronization module 422 in OFDM embodiments may implemented as a symbol timing recovery circuit using known techniques.

The decoder 423 decodes the input digital data to extract and recover the original transmitted information being conveyed, e.g., the downlink traffic channel user data, beacon signals, pilot signals, etc. The decoder 423 includes a broadcast module 424 for decoding broadcast signals, e.g., beacon signal, pilot signals, etc., and a mobile specific module 425 for decoding mobile specific downlink signals, e.g., downlink traffic signals directed to the specific WT 300 to which receiver 401 belongs.

The signal quality detector 426 includes a signal energy measurement circuit 428 for measuring energy content of a signal being evaluated, an SNR circuit 430 for measuring an SNR of a signal being evaluated, and/or an error estimator 432 for estimating error rate of a signal being evaluated. The signal quality detector 426 obtains a quality estimate of signals being forwarded through the $1^{st}$ receiver chain 403, e.g., for the channel being used for downlink traffic channel signaling to receiver 401. The quality estimate is based on the signal energy measurement circuit 428 output, the SNR circuit 430 output which is a function of measured signal energy and/or a measured or estimated error rate of received data/information determined by error estimator 432. Quality estimate information 411, e.g., a quality indicator value, is forwarded to the band selection controller 412.

The second RF processing module 406 includes a second RF filter 434 and a mixer circuit 436 coupled together. The second RF filter 434 may be implemented as a passband filter and serves as a frequency synchronization circuit. The second RF filtering module 406 is tuned to a second carrier frequency selected by the band selection controller 412. In general, the carrier frequency selected by the band selection controller 412 for $2^{nd}$ RF processing module 406 is different than the carrier frequency selected for the $1^{st}$ RF processing module 406. The $2^{nd}$ RF filter 434 passes received signals, e.g., from a second transmitter, within its selected carrier band and rejects at least some signals outside the selected carrier band. The received passband signal from the antenna 402 is input to the RF filter 434 and processed by a mixer circuit 436 resulting in a baseband signal. The resulting baseband signal is output from the second RF processing module 406 and input to a baseband filter 438. The filtered output from the baseband filter 438 is input to an A/D convertor module 440, where analog to digital conversion is performed. In some embodiments, e.g., CDMA embodiments, the signal is processed through a timing synchronization module 442. The timing synchronization module 442 in CDMA embodiments may be implemented using known de-spreading techniques. In some embodiments, e.g., various CDMA embodiments, the signal is processed through a broadcast signal decoder 444. In cases where the signal being processed by the second chain 405 is a beacon or other signal where timing synchronization and/or decoding are not required to generate a signal quality indicator value 413, timing synchronization module 422 and broadcast signal decoder 444 may be omitted. The resulting output digital signal is input to an energy detection and/or SNR detection module 446. The energy detection and/or SNR detection module 446 generates information which can be used as a quality estimate for a potential downlink channel corresponding to the signal being evaluated based on the signal energy measurement or the SNR measurement, the quality estimate information 413. Quality estimate information 413, e.g., a quality indicator value, is forwarded to the band selection controller 412.

The energy detection and/or SNR detection module 446 of the second receiver chain 405 is, in most embodiments, simpler in computational complexity, e.g., either in number of gates or in executable instructions, than the digital signal processing module 420 of the first receiver chain. This is possible because, in many cases, to generate the quality estimate information 413 corresponding to the signal passed through the second receiver chain 405 it is not necessary to decode the received signal and, in cases where decoding is used, it can be limited to decoding of broadcast data which is usually easier to decode than mobile specific data due to the type of coding used compared to the case of mobile specific data and/or the power transmission level of the broadcast data which is often higher than the power transmission level of mobile specific data since the broadcast signal is intended to reach multiple mobile devices.

The quality indicator information (411, 413) forwarded from the digital signal processing module 420 and the energy detection and/or SNR detection module 446, respectively, is used by the band selection controller 412 to make decisions concerning the settings of the carrier frequency bands to be used by the $1^{st}$ and $2^{nd}$ RF processing module 404, 406, e.g., which band, and thus which base station sector transmitter, should be selected for receiving downlink traffic communications, and which band should be selected for additional quality monitoring. In some embodiment, the first receiver module 404 shall remain on the carrier currently being used for downlink traffic channel signals, while the second RF processing module 406 shall be controlled to periodically hunt through the remaining available carrier frequency bands, until a decision is made to change the primary carrier frequency band used for downlink traffic signaling. In which case, the band selection controller 412 would change the carrier selection input to the $1^{st}$ RF processing module 404. Various criteria may be used in making selection decisions of the carrier frequency bands and changes in the selected carrier frequency bands including: comparisons of measured quality indicator values against other measured quality indicator values and/or predetermined thresholds, the current QoS level of the wireless terminal, and/or the overall system loading.

In some embodiments multiple antennas 402 may be used, e.g., one for each receiver chain.

In some embodiments, the first receiver chain 403 is a spread spectrum receiver for receiving a first wideband signal, e.g. CDMA or OFDM. In some embodiments, each of the two receiver chains 403, 405 shown in FIG. 4 process spread spectrum signals, e.g., first and second wideband signals at least 1 MHz wide. The first and second wideband signals may, in some embodiments, correspond to different non-overlapping sets of frequencies. In some OFDM embodiments, the optional synchronization module 442 in the second receiver chain 405 is not used. In some OFDM embodiments, the broadcast signal decoder 444 may be used, while in other OFDM embodiments, the broadcast signal decoder 444 is not needed and is omitted. In embodiments where the received signal being processed by the second receiver chain 405 is a CDMA signal, the synchronization module 442 in the second receiver chain 405 is used, while the broadcast signal decoder 444 may or may not be used. In some embodiments, the broadcast signal decoder 444 may be used to decode broadcast information, e.g., control information, but does not support decoding of user specific data, e.g., data corresponding to a user communications session with another mobile.

The second receiver chain 405 is, in some embodiments, implemented using less hardware than the first receiver chain 403, the hardware used to implement the first receiver chain 403 including more logic gates than the second receiver chain 405. The first and second receiver chains (403, 405) are, in some embodiments, implemented using a programmable processor, the second receiver chain 405 being computationally less complex than the first receiver chain 403 and requiring fewer computations by the programmable processor to implement.

Figure 5:
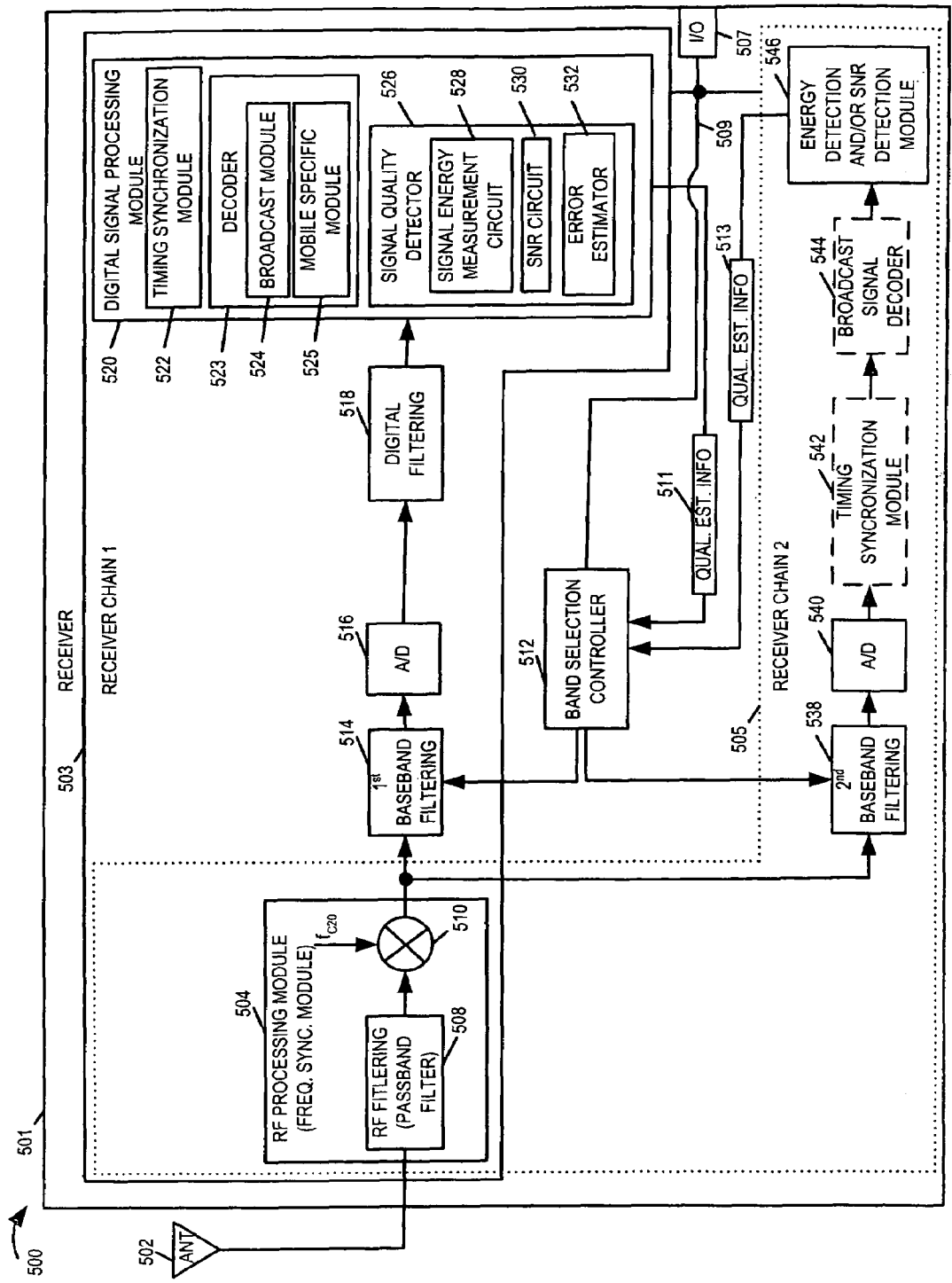
FIG. 5 is a drawing of another exemplary two chain receiver, including a first chain with a higher complexity level than a second chain, wherein both receiver chains share a common RF module and the band selection is controlled through the baseband filters, the receiver implemented in accordance with the present invention and using methods of the present invention.

FIG. 5 is another example of an exemplary wireless terminal receiver 501/antenna 502 combination 500 in accordance with the present invention. The receiver/antenna combination 500 of FIG. 5 may be used as the receiver 302/ antenna 312 combination in the WT 300 of FIG. 3. Receiver 501 illustrates an exemplary embodiment of a receiver, in accordance with the invention, that can process different signals included in the same RF filtered band, e.g., a filtered band including multiple carrier bands corresponding to different base station sector transmitters and/or different transmit antennas, at the same time. Receiver 501 of FIG. 5 includes a first receiver chain 503, a second receiver chain 505, a band selection controller 512, and an I/O interface 507 coupled together via bus 509 over which the various elements may interchange data and information. An RF processing module 504 is common to both first receiver chain 503 and second receiver chain 505. The receiver 501 may communicate with other elements of the WT 300 via I/O interface 507 which couples receiver 501 to bus 312. Decoded downlink traffic channel signals may be conveyed via interface 507 to one or more external devices, e.g., such as a display and/or other WT components.

First receiver chain 503, second receiver chain 505, and band selection controller 512 may correspond to elements (314, 318, 316), respectively, of WT 300 of FIG. 3. The receiver 501 is coupled to an antenna 502 which receives downlink signals from a plurality of base station cell/sector transmitters. The antenna 502 is coupled to a RF processing module (frequency synchronization circuit) 504. The RF processing module 504 includes a RF filter 508 and a mixer circuit 510. The first RF filter 508 may be implemented as a passband filter, e.g., with a passband of 5 MHz, and serves as a frequency synchronization circuit. The received passband signal from the antenna 502 is input to the RF filter 508, filtered, and processed by a mixer circuit 510. A resulting baseband signal is output from the RF processing module 504 and input to a pair of baseband filters 514, 518. Baseband filter 514 is part of first receiver chain 503, while baseband filter 538 is part of second receiver chain 505. The baseband signal may be subdivided into sub-bands, e.g., three or four 1.25 MHHz sub-bands. In some embodiments, each sub-band may correspond to a different carrier. Each received sub-band may correspond to a different, e.g., adjacent, base station cell and/or sector transmitter and may represent an alternative potential attachment point for downlink traffic signaling for the WT. Band selection controller 512 outputs signals to each baseband filter 514, 518, selecting which sub-band to pass.

With respect to the first receiver chain 503, baseband filter 514 passes a first selected sub-band and rejects at least part of the other sub-bands. The filtered output from the baseband filter 514 is input to an A/D convertor module 516, where analog to digital conversion is performed. The resulting output digital signal is input to a digital filter 518 for additional filtering. Then the output of the digital filter 518 is input to a digital signal processing module 520.

The digital signal processing module 520 includes a timing synchronization module 522, a decoder 523, and a signal quality detector 526. Thus, digital signal processing module 520 is capable of fully decoding broadcast as well as WT specific information, e.g., information intended for the individual WT and not other WTs.

The timing synchronization module 522 is used for timing synchronization of received data being processed. CDMA as well as OFDM embodiments are contemplated. The timing synchronization module 522 in CDMA embodiments may be implemented using known de-spreading techniques. The timing synchronization module 522 in OFDM embodiments may implemented as a symbol timing recovery circuit using known techniques. The decoder 523 decodes the input digital data to extract and recover the original transmitted information being conveyed, e.g., the downlink traffic channel user data, beacon signals, pilot signals, etc. The decoder 523 includes a broadcast module 524 for decoding broadcast signals, e.g., beacon signal, pilot signals, etc., and a mobile specific module 525 for decoding mobile specific downlink signals, e.g., downlink traffic signals directed to the specific WT 300 to which receiver 501 belongs.

The signal quality detector 526 includes a signal energy measurement circuit 528 for measuring energy content of a signal being evaluated, an SNR circuit 530 for measuring an SNR of a signal being evaluated, and/or an error estimator 532 for measuring and/or estimating error rate of received data/information of a signal being evaluated. The signal quality detector 526 obtains a quality estimate for the channel currently being to convey information from a base station cell/sector transmitter to receiver 503 within the band currently selected by $1^{st}$ receiver chain, e.g., the channel being used for downlink traffic channel signaling with receiver 501. The quality estimate generated is based on the signal energy measurement circuit 528 output, the SNR circuit 530 output which is a function of the measured signal energy and/or the estimated error rate of received data/information determined by error estimator 532. Quality estimate information 511, e.g., a quality indicator value, is forwarded to the band selection controller 512.

With respect to the second receiver chain 505, baseband filter 538 passes a second selected sub-band and rejects at least part of the other sub-bands. The filtered output from the baseband filter 538 is input to an A/D converter module 540, where analog to digital conversion is performed. In some embodiments, e.g., CDMA embodiments, the signal is processed through a timing synchronization module 542. The timing synchronization module 542 in CDMA embodiments may be implemented using known de-spreading techniques. In some embodiments, e.g., various CDMA embodiments, the signal is processed through a broadcast signal decoder 544.

The resulting output digital signal is input to an energy detection and/or SNR detection module 546. The energy detection and/or SNR detection module 546 generates quality estimate information 513, a quality estimate for a potential downlink channel corresponding to the signal being evaluated based on the signal energy measurement or the SNR measurement. The received signal being evaluated by the second receiver chain 505 may be, e.g., a detected beacon signal transmitted from a adjacent base station cell/sector transmitter with respect to the base station cell/sector transmitter corresponding to the first receiver chain 503. Quality estimate information 513, e.g., a quality indicator value, is forwarded to the band selection controller 512 for use in making band selection decisions, e.g., for selecting between first and second frequency bands corresponding to the first and second receiver chains 503, 505.

The energy detection and/or SNR detection module 546 of the second receiver chain 505 is, in most embodiments, simpler in computational complexity, e.g., either in number of gates or in executable instructions, than the digital signal processing module 820 of the first receiver chain 503. This is possible because, in many cases, to generate the quality estimate information 513 corresponding to the signal passed through second receiver chain 505 it is not necessary to decode the received signal and, in cases where decoding is used, it can be limited to decoding of broadcast data which is usually easier to decode than mobile specific data due to the type of coding used compared to the case of mobile specific data and/or the power transmission level of the broadcast data which is often higher than the power transmission level of mobile specific data since the broadcast signal is intended to reach multiple mobile devices.

The information forwarded from the digital signal processing module 520 and the energy detection and/or SNR detection module 546 is used by the band selection controller 512 to make decisions concerning the settings of the sub-bands chosen for the baseband filters 514, 516. In some embodiment, the first receiver chain baseband filter 514 shall remain on the sub-band being currently being used for downlink traffic channel signals, while the second baseband filter 538 shall be controlled to periodically hunt through the remaining available sub-bands, until a decision is made to change the sub-band used for downlink traffic signaling. Then, the band selection controller 512 changes the setting of the $1^{st}$ baseband filter 514 to the new value. Various criteria may be used in making selection decisions of the sub-bands and changes in the selected sub-bands including: comparisons of measured quality indicator values against other measured quality indicator values and/or predetermined thresholds, the current QoS level of the wireless terminal, and the overall system loading.

In some embodiments, the first receiver chain 503 is a spread spectrum receiver for receiving a first wideband signal, e.g., CDMA or OFDM. In some embodiments, each of the two receiver chains 503, 505 shown in FIG. 5 process spread spectrum signals, e.g., first and second wideband signals at least 1 MHz wide. The first and second wideband signals may, in some embodiments, correspond to different non-overlapping sets of frequencies, e.g. distinct 1.25 MHz bands within a 5 MHz system. In some OFDM embodiments, the optional synchronization module 542 in the second receiver chain 505 is not used. In some OFDM embodiments, the broadcast signal decoder 544 may be used, while in other OFDM embodiments, the broadcast signal decoder 544 is not needed and is omitted. In embodiments where the signal being processed by the second receiver chain 505 is a CDMA signal, the synchronization module 542 in the second receiver chain 505 is used, while the broadcast signal decoder 544 may or may not be used. In some embodiments, the broadcast signal decoder 544 may be used to decode broadcast information, e.g., control information, but does not support decoding of user specific data, e.g., data corresponding to a user communications session with another mobile.

The second receiver chain 505 is, in some embodiments, implemented using less hardware than the first receiver chain 503, the hardware used to implement the first receiver chain 503 including more logic gates than the second receiver chain 505. The first and second receiver chains (503, 505) are, in some embodiments, implemented using a programmable processor, the second receiver chain 505 being computationally less complex than the first receiver chain 503 and requiring fewer computations by the programmable processor to implement.

FIGS. 6-10 illustrate exemplary signaling and band selection by exemplary wireless terminal receivers in accordance with the present invention.

Figure 6:
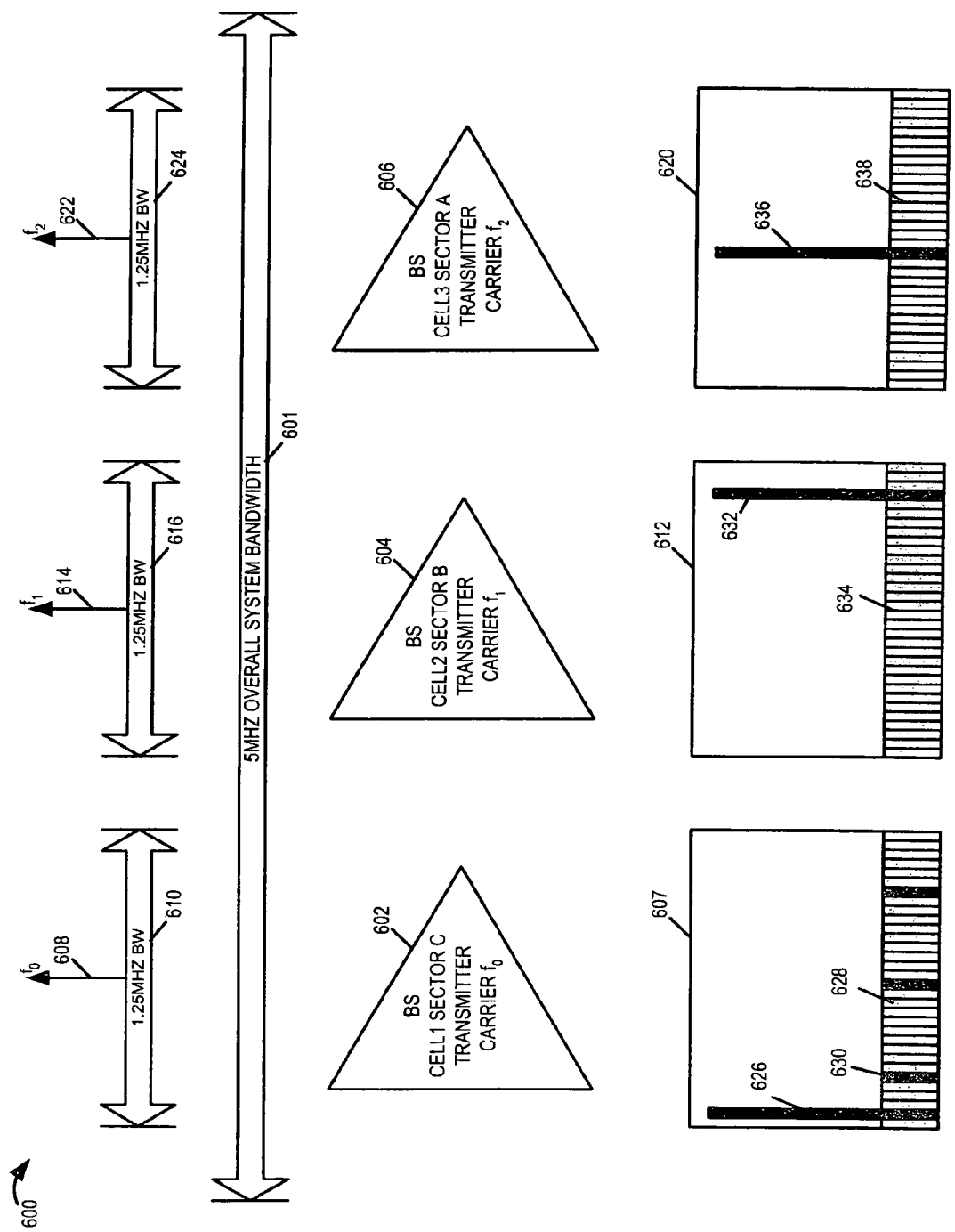
FIGS. 6-10 illustrate exemplary signaling and band selection by exemplary wireless terminal receivers in accordance with the present invention.

FIG. 6 is a drawing 600 illustrating exemplary transmitter signaling. Assume that there is an exemplary wireless terminal, e.g., WT 300, in an exemplary three sector per cell multi-cell wireless communications system using an overall BW of 5 MHz 601. Assume the wireless terminal, e.g., a mobile node in motion, is currently situated in the system such that it can receive some signals from: a BS cell 1 sector C transmitter 602, some signals from a BS 2 sector B transmitter 604, and some signals from a BS 3 sector transmitter 606. Assume that the WT was previously closest to transmitter 602, but is now closest to transmitter 604. BS cell 1 sector C transmitter 602 transmits downlink signals 607 using carrier frequency $f_0$ 608 within a 1.25 MHz BW band 610. BS cell 2 sector B transmitter 604 transmits downlink signals 612 using carrier frequency $f_1$ 614 within a 1.25 MHz BW band 616. BS cell 3 sector A transmitter 606 transmits downlink signals 620 using carrier frequency $f_2$ 622 within a 1.25 MHz BW band 624. Assume that BS cell 1 sector C transmitter 602 is the current point of attachment for the WT of interest regarding downlink traffic channel signaling.

Signals 607 include a beacon signal 626 represented by a large shaded rectangle and downlink traffic signals traffic signals 628 for WTs are represented by small rectangles. Downlink traffic signals 630 intended for the specific WT of interest, e.g., a spread spectrum OFDM signal, have been shaded. Signals 612 include a beacon signal 632 represented by large shaded rectangle and downlink traffic signals traffic signals 634 for WTs represented by small rectangles. Signals 620 include a beacon signal 636 represented by large shaded rectangle and downlink traffic signals traffic signals 638 for WTs represented by small rectangles. In this exemplary embodiment, each of the beacon signals 626, 632, 636 are transmitted at the same transmission power level. In other embodiments, different transmission power levels may be used for different beacon signals, provided the WT knows the transmission power assigned to each beacon signal or knows a relationship between the transmission power levels assigned to different beacon signals.

Figure 7:
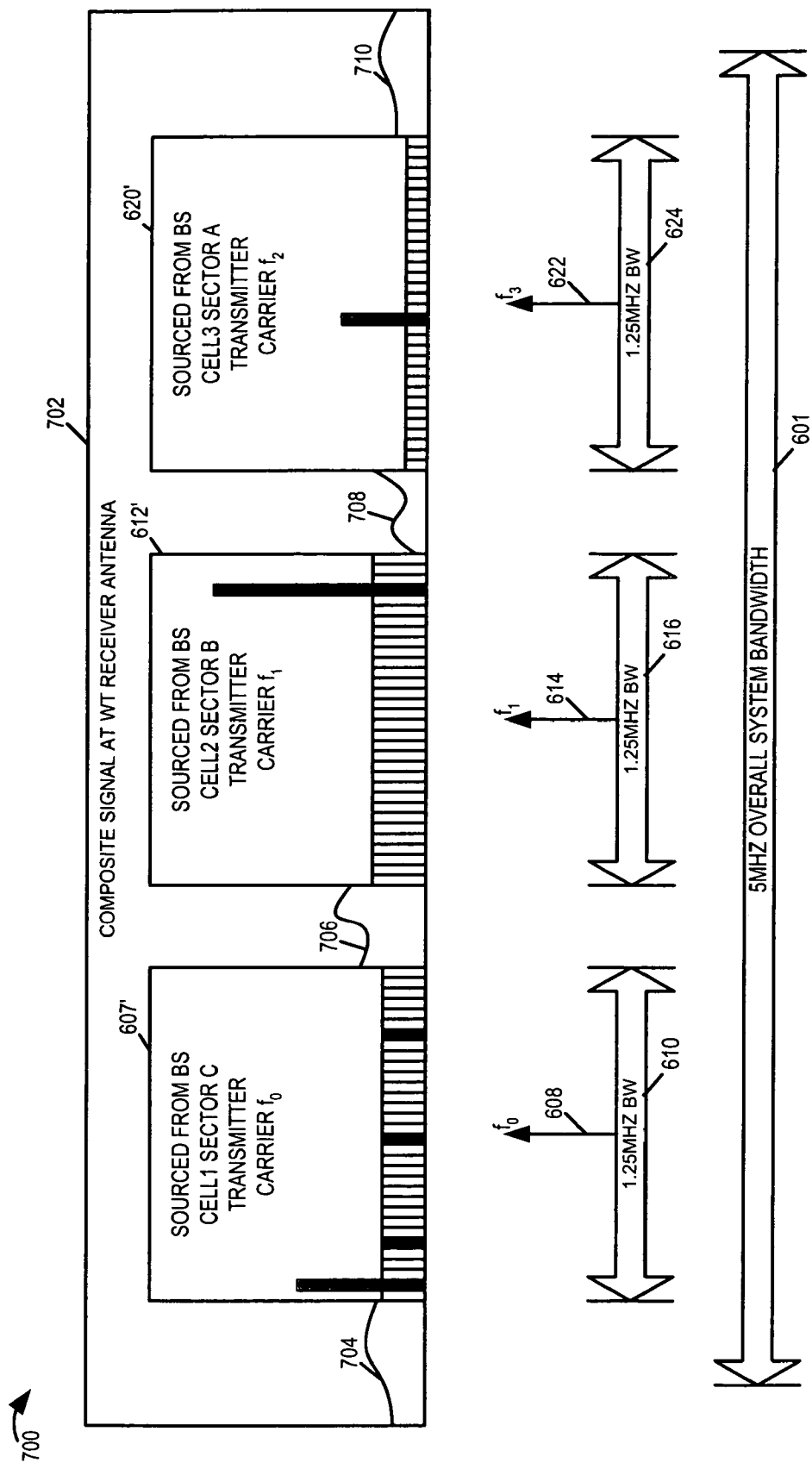

FIG. 7 is a drawing 700 illustrating an exemplary composite signal 702 at a WT receiver and associated frequency information. FIG. 7, signal 702 represents a composite signal at the receiver antenna of the WT of interest. Signal 702 includes components 704, 607', 706, 612', 708, 620', and 710. Components 704, 706, 708, 710 represent noise signals outside the frequency bands of interest 610, 616, 624. Signals 607' represents a received copy of signals 607 sourced from BS cell 1 sector C transmitter 602 with carrier frequency $f_0$ 608. Signal 607' has been moderately reduced in amplitude from the transmitted signal 606, e.g., due to channel gain, and has also been altered by noise. Signals 612' represents a received copy of signals 612 sourced from BS cell 2 sector B transmitter 604 with carrier frequency $f_1$ 614. Signal 612' has been slightly reduced in amplitude from the transmitted signal 612, e.g., due to channel gain, and has also been altered by noise. Signals 620' represents a received copy of signals 620 sourced from BS cell 3 sector A transmitter 606 with carrier frequency $f_2$ 622. Signal 620' has been slightly reduced in amplitude from the transmitted signal 620, e.g., due to channel gain, and has also been altered by noise.

Figure 8:
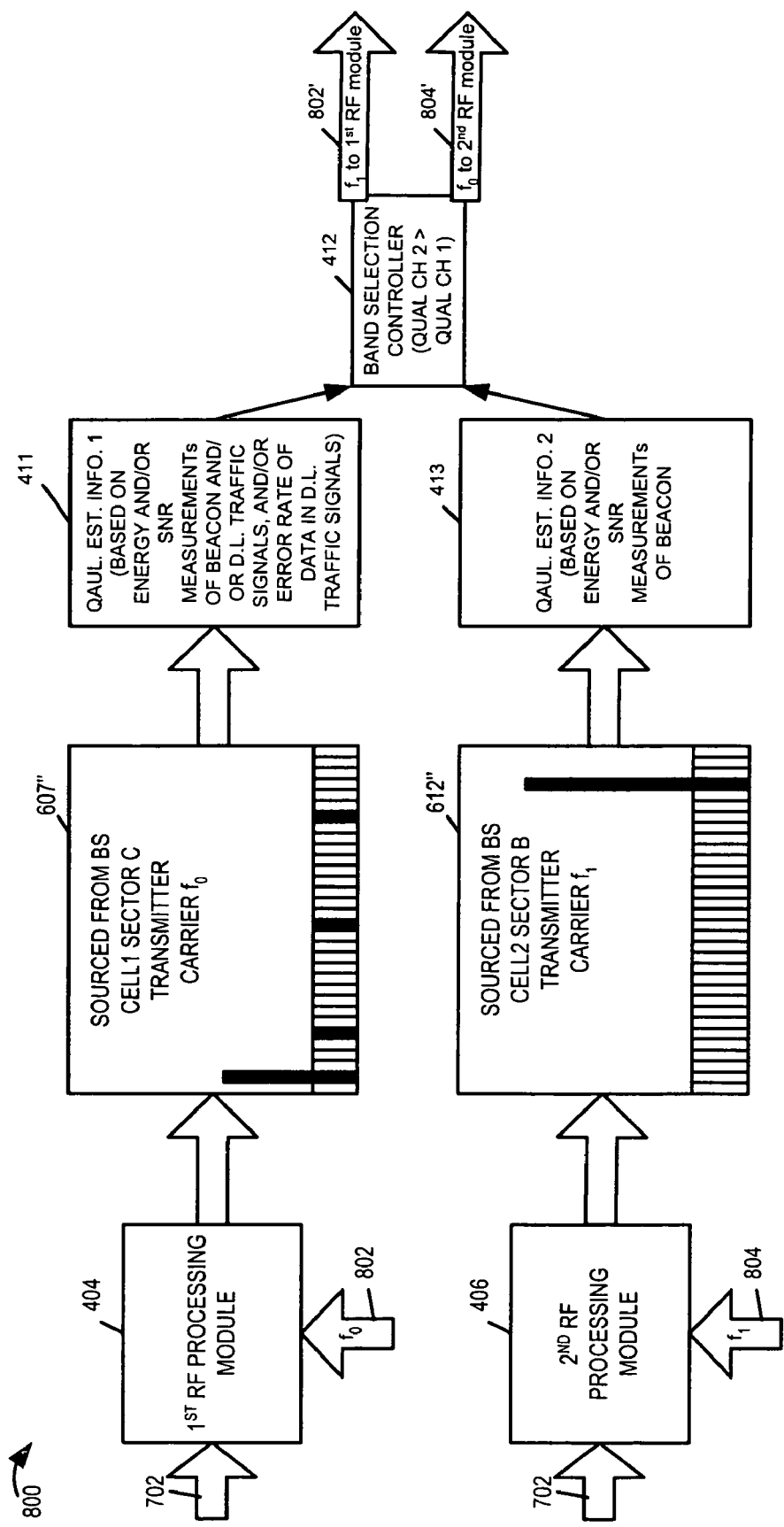

FIG. 8 is a drawing 800 illustrating band selection in an exemplary WT embodiment, where the receiver is an embodiment of the two RF module receiver 400 of FIG. 4. The composite signal 702 of FIG. 7 is received by both the $1^{st}$ RF processing module 404 and the second RF processing module 406. As previously described, BS cell 1 sector C transmitter 602 is the current connection point for downlink traffic signaling to the WT of interest and as such, the band selection controller 412 has sent signal 802 to $1^{st}$ RF processing module 404 selecting frequency $f_0$. Band selection controller 412 has sent signal 804 to $2^{nd}$ processing module 406 selecting frequency $f_1$.

$1^{st}$ RF processing module 404 extracts baseband signal 607'' from signal 702, a filtered representation of the information included in signals 607'. Similarly, $2^{nd}$ RF processing module 406 extracts baseband signal 612'' from signal 702, a filtered representation of the information included in signals 612'.

Information 606'' is processed by the first receiver chain components 414, 416, 418, 420 to obtain quality estimate information 1 411. Quality estimate information 1 411 is based on the energy and SNR estimates of the processed beacon signal 626 and the processed downlink traffic signals 630 intended for and received by the WT of interest. In addition information 411 is also based on the error rate of the data received in the downlink traffic signals intended for the WT of interest.

Information 612'' is processed by the second receiver chain components 438, 440, 442, 444, 446 to obtain quality estimate information 2 413. Quality estimate information 2 413 is based on the energy and SNR estimates of the processed beacon signal 632.

Band selection controller receives information 411, 413 decides that the quality of channel 2 is better than the quality of channel 1 and that the WT should change its attachment point. At the appropriate time, e.g., to minimize disruption in service, band selection controller 412 sends signal 802' to $1^{st}$ RF processing module 404 to change the selection to frequency $f_1$ and sends signal 804' to $2^{nd}$ RF processing module 406 to change the selection to $f_0$.

Figure 9:
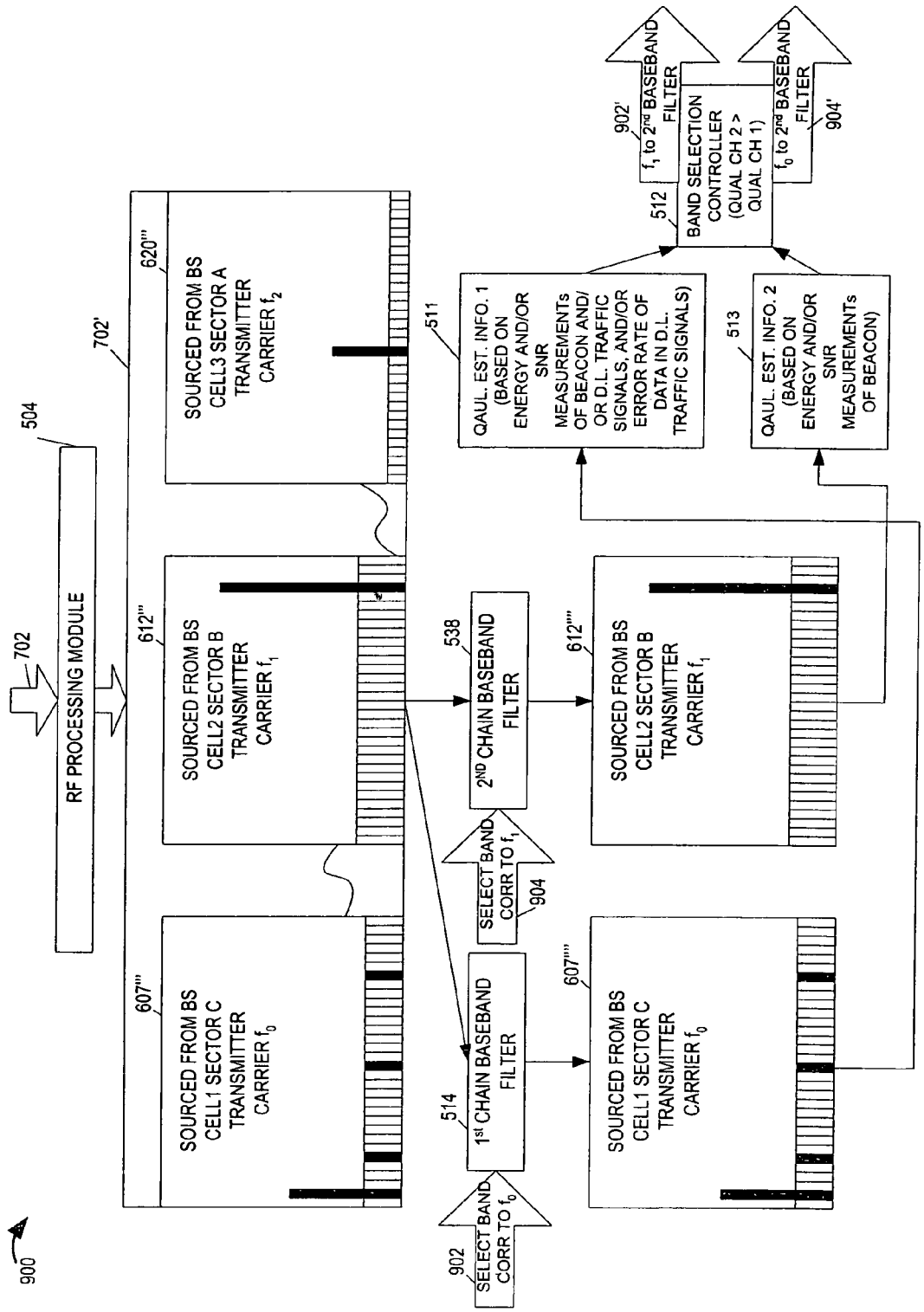

FIG. 9 is a drawing 900 illustrating band selection in an exemplary WT embodiment, where the receiver is an embodiment of the two chain receiver 500 of FIG. 5 which includes a common RF module 504. The composite signal 702 of FIG. 7 is received by the common RF module 504. As previously described, BS cell 1 sector C transmitter 602 is the current connection point for downlink traffic signaling to the WT of interest and as such, the band selection controller 512 has sent signal 902 to $1^{st}$ chain baseband filter 514 selecting information corresponding to frequency $f_0$ band. Band selection controller 512 has sent signal 904 to $2^{nd}$ chain baseband filter 538 selecting information corresponding to frequency $f_1$ band.

Common RF processing module 504 extracts baseband signal 702' from signal 702, a filtered representation, e.g., baseband signal representation, of the information included in signals 702. Baseband signal 702' includes information (607''', 612''', 620''') representations of the information included in signals (607', 612', 620'), respectively. Baseband signal 702' is routed to $1^{st}$ chain baseband filter 514 and $2^{nd}$ chain baseband filter 538. $1^{st}$ chain baseband filter 514 extracts information 607'''', a representation of information 607''', while $2^{nd}$ chain baseband filter 538 extracts information 612'''', a representation of information 612'''. Information 607'''' is processed by the first receiver chain components 516, 518, 520 to obtain quality estimate information 1 511. Quality estimate information 1 511 is based on the energy and SNR estimates of the processed beacon signal 626 and the processed downlink traffic signals 630 intended for and received by the WT of interest. In addition information 511 is also based on the error rate of the data received in the downlink traffic signals 630 intended for the WT of interest.

Information 612'''' is processed by the second receiver chain components 540, 542, 544, 546 to obtain quality estimate information 2 513. Quality estimate information 2 513 is based on the energy and SNR estimates of the processed beacon signal 632.

Band selection controller receives information 511, 513 decides that the quality of channel 2 is better than the quality of channel 1 and that the WT should change its attachment point. At the appropriate time, e.g., to minimize disruption in service, band selection controller 512 sends signal 902' to $1^{st}$ baseband filter 514 to change the selection to frequency $f_1$ and sends signal 904' to $2^{nd}$ baseband filter 538 to change the selection to $f_0$.

Figure 10:
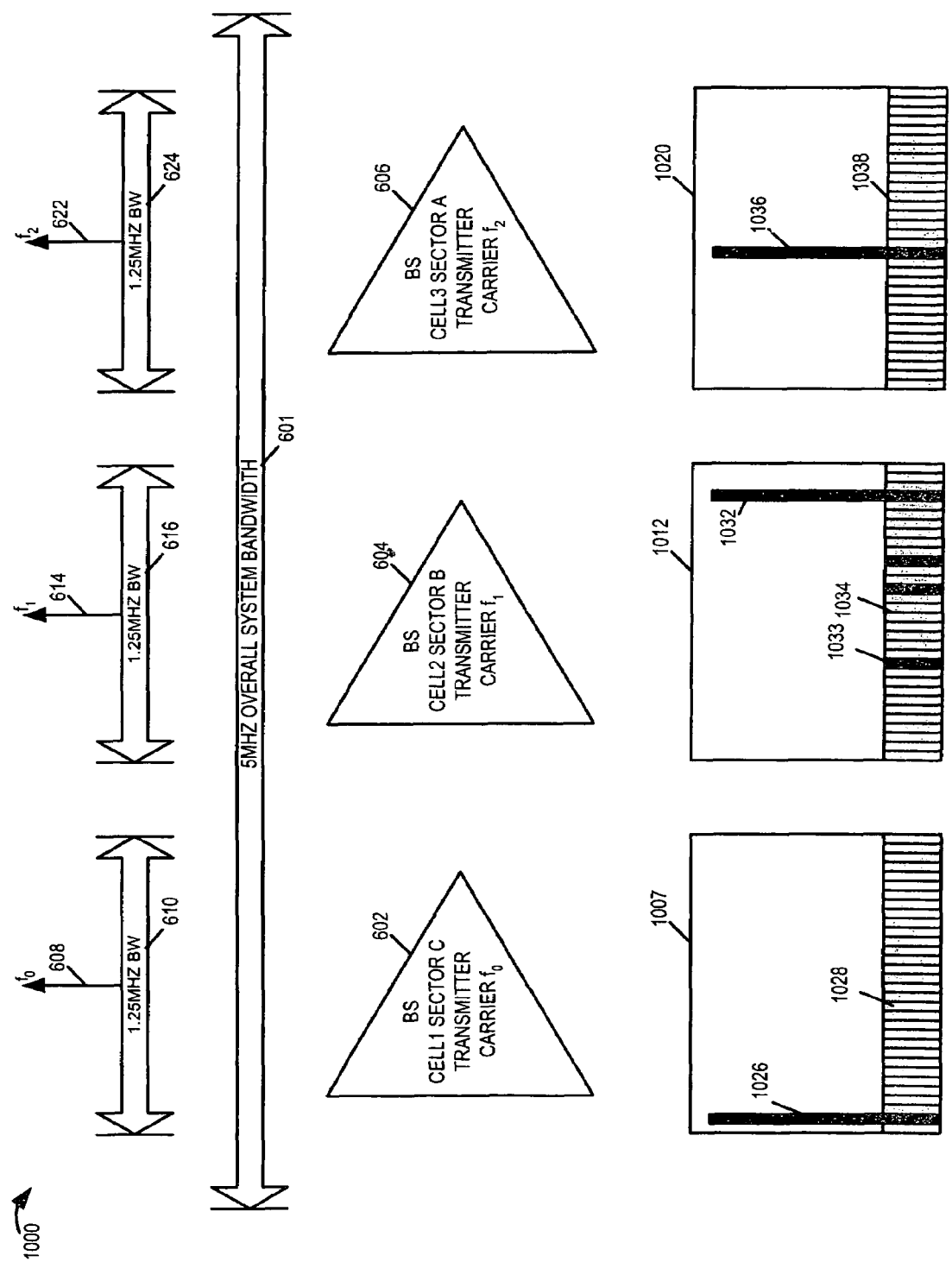

FIG. 10 is a drawing 1000 illustrating exemplary transmitter signaling after the wireless terminal of interest has changed it band selection and attachment point. The WT of interest can receive some signals from: BS cell 1 sector C transmitter 602, some signals from BS 2 sector B transmitter 604, and some signals from BS 3 sector transmitter 606. BS cell 1 sector C transmitter 602 transmits downlink signals 1007 using carrier frequency $f_0$ 608 within a 1.25 MHz BW band 610. BS cell 2 sector B transmitter 604 transmits downlink signals 1012 using carrier frequency $f_1$ 614 within a 1.25 MHz BW band 616. BS cell 3 sector A transmitter 618 transmits downlink signals 1020 using carrier frequency $f_2$ 622 within a 1.25 MHz BW band 624. Assume that BS cell 2 sector B transmitter 604 is now the current point of attachment for the WT of interest regarding downlink traffic channel signaling.

Signals 1006 include a beacon signal 1026 represented by a large shaded rectangle and downlink traffic signals traffic signals 1028 for WTs are represented by small rectangles. Signals 1012 include a beacon signal 1032 represented by a large shaded rectangle and downlink traffic signals traffic signals 1034 for WTs represented by small rectangles. Downlink traffic signals 1033 intended for the specific WT of interest, e.g., an OFDM spread spectrum signal, have been shaded. Signals 1020 includes a beacon signal 1036 represented by a large shaded rectangle and downlink traffic signals traffic signals 1038 for WTs represented by small rectangles.

Although the examples of FIGS. 8, and 9 show comparisons between information corresponding to two carrier bands resulting in a change in band selection, in some embodiments, information may be collected on other available carrier bands and evaluated before a decision to switch carriers if performed. For example, the $1^{st}$ receiver chain 403 or 503 may remain fixed on one carrier, e.g., the carrier being currently used as the attachment point for downlink traffic signaling, while the $2^{nd}$ receiver chain 405 or 505 may be alternated through each of the potential alternative carriers in order to obtain a set of quality indicator information from which a band selection may be performed.

In some embodiments, where the wireless terminal is currently not attached to a transmitter for downlink signaling, and the wireless terminal desires to attach, each of the receiver chains may be set and used to search for potential carriers, collecting quality information, so that a band selection may be performed.

In one exemplary OFDM (Orthogonal Frequency Division Multiplexed) embodiment, a beacon signal is implemented as a relatively high powered signal that is transmitted as a narrow signal in terms of frequency, e.g., using a single. When a beacon signal is transmitted in the exemplary OFDM embodiment, most of the transmission power is concentrated on one or a small number of tones, which comprise the beacon signal. In some embodiments, the beacon signals are narrow in frequency width compared to the band of the passband filter, e.g., at most 1/20 the frequency width of the passband filter.

In one embodiments, the quality indicator is generated by a receiver is produced by receiving a signal that includes a beacon signal, e.g., a narrow (in terms of frequency) high power signal, transmitted by a transmitter. In one such embodiment, the received signal is subject to a time to frequency domain processing operation which produces a plurality of signal components corresponding to different signal tones where each tone corresponds to a different frequency. The energy in one of the signal tones, e.g., the tone corresponding the beacon signal, is measured and used as an estimate of the quality of the channel to the transmitter from which the beacon signal was received. This process may be performed by each of the two receiver chains with each receiver chain processing a beacon signal from a different transmitter. Such an embodiment is particularly well suited for OFDM applications.

While described primarily in the context of an OFDM system, the methods and apparatus of the present invention, are applicable to a wide range of communications systems including many non-OFDM and/or non-cellular systems.

In some but not necessarily all embodiments, beacon signal tones are transmitted with a per tone signal energy which is 10, 20, 30 or more times the average per tone signal energy of signal tones used to transmit user data and/or non-beacon control signals. In the case of a single tone beacon signal, the frequency of the beacon signal can be readily determined from the frequency of the single high power tone which makes up the beacon signal. The energy in beacon signals received from different transmitters can be measured and used as an indicator of channel quality. Comparisons of beacon signal energy can be used to select between carriers corresponding to transmitters which transmitted the beacon signals with the transmitter corresponding to the higher power beacon signal being selected in many cases.

In various embodiments nodes described herein are implemented using one or more modules to perform the steps corresponding to one or more methods of the present invention, for example, carrier band selection, digital signal processing, energy detection/SNR detection, decoding, timing synchronization, signal quality detection, etc. Energy detection may involve measuring the energy in a signal or signal component. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A portable communications device comprising:
    a first receiver chain including:
        a first controllable filter;
        a first decoder circuit coupled to said first controllable filter;
        a signal quality detector; and
        a second receiver chain which is less complex than said first receiver chain and is implemented using fewer components than said first receiver chain, the second receiver chain including:
            i) a second controllable filter; and
            ii) a first energy detection module coupled to said second controllable filter; and
        a band selection controller coupled to said signal quality detector, said energy detector, said first and second controllable filters, and said band selection controller selecting the frequency band of the first controllable filter as a function of a first signal quality indicator received from said signal quality detector, and a second signal quality indicator corresponding to an output of said energy detection circuit.

2. The portable communications device of claim 1, wherein said signal quality detector includes at least one of a second signal energy detection module, a signal to noise module and an error estimation module.

3. The portable communications device of claim 2, wherein said first energy detection module is included in a signal to noise measurement module.

4. The portable communications device of claim 1, wherein said first receiver chain is capable of decoding mobile specific signals intended solely for said portable communications device; and
    wherein said second receiver chain lacks a decoder capable of decoding mobile specific signals.

5. The portable communications device of claim 1, wherein said first and second controllable filter modules are passband filter modules.

6. The portable communications device of claim 1, wherein said first and second controllable filter modules are baseband filter modules, the first and second receiver chains further comprising:
    a shared passband filter having an output coupled to the first controllable filter and to the second controllable filter, the shared passband filter having a bandwidth which passes signals processed by both said first and said second controllable baseband filters.

7. The communications device of claim 1, wherein said band selection controller is further coupled to a second frequency synchronization circuit, said band selection controller operating to control a first frequency synchronization circuit to be synchronized to a first frequency band and controlling said second frequency synchronization circuit to be synchronized to a second frequency band which is different from said first frequency band.

8. The communications device of claim 1, wherein said decoder in said first receiver chain includes circuitry for decoding broadcast data in addition to mobile specific data, said broadcast data including control information and said mobile specific data including data corresponding to a mobile communications session with another remote communications device.

9. The communications device of claim 8, wherein said second receiver chain includes a decoder for decoding broadcast data but does not include circuitry for decoding mobile specific data, an output of said decoder being supplied to said first energy detection module.

10. The communications device of claim 7, wherein said second receiver chain does not include a decoder circuit.

11. The communications device of claim 1, wherein the signal quality detector detects the signal to noise ratio (SNR) if a first spread spectrum signal transmitted using a first frequency band corresponding to a first frequency synchronization circuit.

12. The communications device of claim 1, wherein said signal quality detector includes an energy detection circuit for detecting signal energy.

13. The communications device of claim 1, wherein said signal quality detector generates a signal quality indicator signal based on a detected error rate.

14. The communications device of claim 1, wherein said first energy detection module is part of a SNR detection circuit.

15. The communications device of claim 1, wherein the synchronization circuit is a spread spectrum timing synchronization circuit.

16. The communications device of claim 15, wherein said spread spectrum system is an OFDM system.

17. The communications device of claim 15, wherein the second receiver chain does not include a timing synchronization circuit.

18. The communications device of claim 1, further including a timing synchronization circuit wherein said timing synchronization circuit is a pilot based timing synchronization circuit which processes a CDMA pilot signal.

19. The communications device of claim 18, wherein said second receiver chain includes a pilot timing synchronization circuit coupled to said energy detection circuit.

20. The device of claim 1, wherein said first receiver chain is a spread spectrum receiver chain for receiving a first wideband signal.

21. The device of claim 20, wherein said second receiver chain is also a spread spectrum receiver chain for receiving a second wideband signal, the first and second wideband signals being at least 1 MHz wide.

22. The device of claim 21, wherein said first and second wideband signals correspond to different non-overlapping sets of frequencies.

23. The device of claim 1, wherein the second receiver chain is implemented using less hardware than said first receiver chain, the hardware used to implement the first receiver chain including more logic gates than said second receiver chain.

24. The device of claim 1 wherein said first and second receiver chains are implemented using a programmable processor, the second receiver chain being computationally less complex to implement than said first receiver chain and requiring fewer computations by said programmable processor to implement.

25. The device of claim 24, wherein said second receiver chain requires less than half the number of computations to implement than are required to implement said first receiver chain.

26. The device of claim 1, wherein said first frequency synchronization circuit is a passband filter.

27. The device of claim 1, wherein the first frequency synchronization circuit is an RF processing module which includes a mixer.

28. A method of operating a portable communications device comprising:
  operating a first receiver chain to process a first signal, processing said first signal including:
    i) performing a filtering operation on the first signal using a first controllable filter to generate a first filtered signal;
    ii) performing a decoding operation on the first filtered signal using a first decoder circuit coupled to said first controllable filter; and
    iii) generating, using a signal quality detector, a first signal quality indicator used to indicate the quality of the first signal; and
  operating a second receiver chain which is less complex than said first receiver chain and is implemented using fewer components than said first receiver chain, to process a second signal, processing said second signal including:
    i) performing a filtering operation on the second signal using a second controllable filter to generate a second filtered signal;
    ii) generating an estimate of the energy of the second filtered signal using a first energy detection module; and
    iii) producing from the generated estimate of the energy a second signal quality indicator; and
  selecting the frequency band of the first controllable filter as a function of the first signal quality indicator and the second signal quality indicator.

29. The method of claim 28, wherein generating a first signal quality indicator includes using at least one of a second signal energy detection module, a signal to noise module and an error estimation module to generate said first signal quality indicator.

30. The method of claim 29,
  wherein said second signal quality indicator is a noise indicator; and
  wherein producing from the generated estimate of the energy a second signal quality indicator includes performing a noise measurement.

31. The method of claim 28,
  wherein performing a decoding operation includes decoding mobile specific signals intended solely for said portable communications device; and
  wherein operating the second receiver chain does not involve decoding mobile specific signals.

32. The method of claim 28,
  wherein performing the filtering operation on the first signal includes performing a first passband filtering operation; and
  wherein performing the filtering operation on the second signal includes performing a second passband filtering operation.

33. The method of claim 28, further comprising:
  receiving a signal;
  performing a passband filtering operation on said received signal;
  mixing the filtered received signal to baseband to produce a baseband signal; and
  supplying the baseband signal to said first controllable filter and to said second controllable filter, the baseband signal supplied to the first controllable filter being said first signal, the baseband signal supplied to the second controllable filter being said second signal.

34. The method of claim 28, further comprising:
  controlling the first receiver to be synchronized to said selected frequency band; and
  controlling the second receiver to be synchronized to a second frequency band which is different from said selected frequency band.

35. The method of claim 28, wherein performing a decoding operation on the first filtered signal includes decoding broadcast data in addition to mobile specific data, said broadcast data including control information and said mobile specific data including data corresponding to a mobile communications session with another remote communications device.

36. The method of claim 35, further comprising:
  operating the second receiver to decode broadcast data but not mobile specific data.

37. The method of claim 28, wherein generating a first signal quality indicator includes detecting the signal to noise ratio (SNR) of a first spread spectrum signal transmitted using a first frequency band.

38. The method of claim 28, wherein generating a first signal quality indicator includes detecting signal energy.

39. The method of claim 28, wherein generating a first signal quality indicator includes detecting an error rate.

40. A portable communications device comprising:
  first receiver chain means for processing a first signal, said first receiver chain means including:
    i) means for performing a filtering operation on the first signal using a first controllable filter to generate a first filtered signal;
    ii) means for performing a decoding operation on the first filtered signal using a first decoder circuit coupled to said first controllable filter; and
    iii) means for generating, using a signal quality detector, a first signal quality indicator used to indicate the quality of the first signal; and
  second receiver chain means, which is less complex than said first receiver chain and is implemented using fewer components than said first receiver chain means, for processing a second signal, said second receiver chain means including:
    i) means for performing a filtering operation on the second signal using a second controllable filter to generate a second filtered signal;
    ii) means for generating an estimate of the energy of the second filtered signal using a first energy detection module; and
    iii) means for producing from the generated estimate of the energy a second signal quality indicator; and means for selecting the frequency band of the first controllable filter as a function of the first signal quality indicator and the second signal quality indicator.

41. The apparatus of claim 40, wherein said means for generating a first signal quality indicator includes:
means for using at least one of a second signal energy detection module, a signal to noise module and an error estimation module to generate said first signal quality indicator.

42. The apparatus of claim 41,
wherein said second signal quality indicator is a noise indicator; and
wherein said means for producing from the generated estimate of the energy a second signal quality indicator includes means for performing a noise measurement.

43. The apparatus of claim 40,
wherein said means for performing a decoding operation includes means for decoding mobile specific signals intended solely for said portable communications device; and
wherein said second receiver chain means does not decode mobile specific signals.

44. The apparatus of claim 40,
wherein said means for performing a filtering operation on the first signal includes means for performing a first passband filtering operation; and
wherein said means for performing a filtering operation on the second signal includes means for performing a second passband filtering operation.

45. The apparatus of claim 40, further comprising:
means for receiving a signal;
means for performing a passband filtering operation on said received signal;
means for mixing the filtered received signal to produce a baseband signal; and
supplying the baseband signal to said first controllable filter and to said second controllable filter, the baseband signal supplied to the first controllable filter being said first signal, the baseband signal supplied to the second controllable filter being said second signal.

46. The apparatus of claim 40, further comprising:
means for controlling the first receiver means to be synchronized to said selected frequency band; and
means for controlling the second receiver means to be synchronized to a second frequency band which is different from said selected frequency band.

47. The apparatus of claim 40, wherein said means for performing a decoding operation on the first filtered signal includes:
means for decoding broadcast data in addition to mobile specific data, said broadcast data including control information and said mobile specific data including data corresponding to a mobile communications session with another remote communications device.

48. The apparatus of claim 47, wherein the second receiver means further includes:
means for decoding broadcast data but not mobile specific data.

49. The apparatus of claim 40, wherein said means for generating a first signal quality indicator includes:
means for detecting the signal to noise ratio (SNR) of a first spread spectrum signal transmitted using a first frequency band.

50. The apparatus of claim 40, wherein said means for generating a first signal quality indicator includes:
means for detecting signal energy.

51. The apparatus of claim 40, wherein said means for generating a first signal quality indicator includes:
means for detecting an error rate.

52. A computer readable medium comprising:
stored instructions for controlling a first receiver chain to:
i) perform a filtering operation on a first signal using a first controllable filter to generate a first filtered signal;
ii) perform a decoding operation on the first filtered signal using a first decoder circuit coupled to said first controllable filter; and
iii) generate, using a signal quality detector, a first signal quality indicator used to indicate the quality of the first signal; and
stored instructions for controlling a second receiver chain which is less complex than said first receiver chain and is implemented using fewer components than said first receiver chain, to:
i) perform a filtering operation on the second signal using a second controllable filter to generate a second filtered signal;
ii) generate an estimate of the energy of the second filtered signal using a first energy detection module; and
iii) produce from the generated estimate of the energy a second signal quality indicator; and
stored instructions for controlling a module to select the frequency band of the first controllable filter as a function of the first signal quality indicator and the second signal quality indicator.

53. The computer readable medium of claim 52, wherein generating a first signal quality indicator includes using at least one of a second signal energy detection module, a signal to noise module and an error estimation module to generate said first signal quality indicator.

54. The computer readable medium of claim 52,
wherein said second signal quality indicator is a noise indicator; and
wherein producing from the generated estimate of the energy a second signal quality indicator includes performing a noise measurement.

55. The computer readable medium of claim 52,
wherein performing a decoding operation includes decoding mobile specific signals intended solely for said portable communications device; and
wherein operating a second receiver chain does not involve decoding mobile specific signals.

56. The computer readable medium of claim 52,
wherein performing a filtering operation on the first signal includes performing a first passband filtering operation; and
wherein performing a filtering operation on the second signal includes performing a second passband filtering operation.

57. The computer readable medium of claim 52, further comprising:
stored instructions for controlling a receiver to receive a signal;
stored instructions for controlling a passband filter to perform a passband filtering operation on said received signal;
stored instructions for controlling a mixer to mix the filtered received signal to baseband to produce a baseband signal and to supply the baseband signal to said first controllable filter and to said second controllable filter, the baseband signal supplied to the first controllable filter being said first signal, the baseband signal supplied to the second controllable filter being said second signal.

58. The computer readable medium of claim 52, further comprising:
stored instructions for controlling the first receiver to be synchronized to said selected frequency band; and
stored instructions controlling the second receiver to be synchronized to a second frequency band which is different from said selected frequency band.

59. A processor comprising:
a first receiver chain configured to:
  i) perform a filtering operation on a first signal using a first controllable filter to generate a first filtered signal;
  ii) perform a decoding operation on the first filtered signal using a first decoder circuit coupled to said first controllable filter; and
  iii) generate, using a signal quality detector, a first signal quality indicator used to indicate the quality of the first signal; and
a second receiver chain which is less complex than said first receiver chain and is implemented using fewer components than said first receiver chain, the second receiver chain being configured to:
  i) perform a filtering operation on the second signal using a second controllable filter to generate a second filtered signal;
  ii) generate an estimate of the energy of the second filtered signal using a first energy detection module; and
  iii) produce from the generated estimate of the energy a second signal quality indicator; and
a control module configured to select the frequency band of the first controllable filter as a function of the first signal quality indicator and the second signal quality indicator.

60. The processor of claim 59, further comprising:
at least one of a second signal energy detection module, a signal to noise module and an error estimation module; and
wherein generating a first signal quality indicator includes using at least one of said second signal energy detection module, said signal to noise module and said error estimation module to generate said first signal quality indicator.

61. The processor of claim 60,
wherein said second signal quality indicator is a noise indicator; and
wherein said second receiver chain includes a noise measurement module for use in producing from the generated estimate of the energy the second signal quality indicator.

62. The processor of claim 59,
wherein the first receiver chain includes a mobile specific signal decoder; and wherein performing a decoding operation includes decoding mobile specific signals intended solely for said portable communications device; and
wherein said a second receiver chain does not involve decoding mobile specific signals.

63. The processor of claim 59,
wherein said first receiver chain includes a controllable passband filter for performing a passband filtering operation on the first signal; and
wherein said second receiver chain includes a controllable filter for performing a second passband filtering operation on the second signal.

64. The processor of claim 59, further comprising:
a receiver for receiving a signal;
a passband filter for performing a passband filtering operation on said received signal; and
a mixer for mixing the filtered received signal to baseband to produce a baseband signal and for supplying the baseband signal to said first controllable filter and to said second controllable filter, the baseband signal supplied to the first controllable filter being said first signal, the baseband signal supplied to the second controllable filter being said second signal.

* * * * *